US009005552B2

(12) United States Patent
Watanabe et al.

(10) Patent No.: US 9,005,552 B2
(45) Date of Patent: Apr. 14, 2015

(54) SELECTIVE CO METHANATION CATALYST, METHOD OF PRODUCING THE SAME, AND APPARATUS USING THE SAME

(75) Inventors: Masahiro Watanabe, Kofu (JP); Hisao Yamashita, Kofu (JP); Kazutoshi Higashiyama, Kofu (JP); Toshihiro Miyao, Kofu (JP); Aihua Chen, Beijing (CN)

(73) Assignee: University of Yamanashi, Yamanashi (JP)

( * ) Notice: Subject to any disclaimer, the term of this patent is extended or adjusted under 35 U.S.C. 154(b) by 167 days.

(21) Appl. No.: 13/278,990

(22) Filed: Oct. 21, 2011

(65) Prior Publication Data

US 2012/0063963 A1    Mar. 15, 2012

Related U.S. Application Data

(63) Continuation-in-part of application No. PCT/JP2010/054279, filed on Mar. 9, 2010.

(30) Foreign Application Priority Data

Apr. 24, 2009  (JP) ................. 2009-106938

(51) Int. Cl.
  *B01J 8/00*   (2006.01)
  *H01M 8/06*   (2006.01)
  (Continued)

(52) U.S. Cl.
  CPC .............. *H01M 8/0668* (2013.01); *B01J 23/40* (2013.01); *B01J 23/755* (2013.01); *B01J 35/006* (2013.01);
  (Continued)

(58) Field of Classification Search
  CPC .............. B01J 7/00; B01J 8/00; B01J 8/02; B01J 8/08; B01J 19/00; B01J 23/00; B01J 35/00; B01J 35/0006; B01J 35/02; B01J 35/04; C23C 2/00; C23C 4/00; C23C 4/04; C23C 4/06; C23C 4/12; C23C 4/127

USPC ......... 422/129, 149, 168, 177, 180, 187, 600, 422/625, 627, 167; 502/100, 300, 325–327, 502/332, 335; 427/446, 455–457, 532, 533, 427/535, 569
  See application file for complete search history.

(56) References Cited

U.S. PATENT DOCUMENTS

| 4,145,400 A | 3/1979 | Adsetts |
| 4,738,946 A | 4/1988 | Yamashita et al. |

(Continued)

FOREIGN PATENT DOCUMENTS

| JP | 51-149191 A | 12/1976 |
| JP | 52-133897 A | 11/1977 |

(Continued)

OTHER PUBLICATIONS

Pershin et al., Effect of Substrate Temperature on Adhesion Strength of Plasma-Sprayed Nickel Coatings, Dec. 10, 2002, Journa; of Thermal Spray Technology, vol. 12(3), p. 370-376.*

(Continued)

*Primary Examiner* — Natasha Young
(74) *Attorney, Agent, or Firm* — Birch, Stewart, Kolasch & Birch, LLP

(57) ABSTRACT

Provided is a new catalyst capable of removing carbon monoxide economically without adding particular reaction gas externally. Also provided are a process for producing and an apparatus using such a catalyst. Impregnation of a Ni—Al composite oxide precursor of a nonstoichiometric composition prepared by the solution-spray plasma technique with a ruthenium salt to be supported and performing reduction treatment allows CO methanation reaction to selectively proceed even in the high-temperature range in which $CO_2$ methanation reaction and reverse water-gas-shift reaction proceed preferentially with conventional catalysts. Selective CO methanation reaction occurs reproducibly with another Ni—Al composite oxide precursor or an additive metallic species. Also, the low-temperature activity of CO methanation reaction can be improved through steps different from conventional catalyst production processes in producing such a catalyst material, whereby the temperature window the resulting catalyst material has can be utilized most effectively.

9 Claims, 21 Drawing Sheets

(51) Int. Cl.
| | |
|---|---|
| B01J 23/755 | (2006.01) |
| B01J 35/08 | (2006.01) |
| B01J 37/03 | (2006.01) |
| B01J 37/34 | (2006.01) |
| C01B 3/38 | (2006.01) |
| C01B 3/48 | (2006.01) |
| C01B 3/58 | (2006.01) |
| B01J 8/02 | (2006.01) |
| B01J 8/08 | (2006.01) |
| B01J 19/00 | (2006.01) |
| B01J 23/00 | (2006.01) |
| B01J 35/00 | (2006.01) |
| B01J 35/02 | (2006.01) |
| B01J 35/04 | (2006.01) |
| C23C 4/00 | (2006.01) |
| C23C 4/04 | (2006.01) |
| C23C 4/06 | (2006.01) |
| C23C 4/12 | (2006.01) |
| B01J 23/40 | (2006.01) |
| B01J 35/10 | (2006.01) |

(52) U.S. Cl.
CPC . *B01J 35/04* (2013.01); *B01J 35/08* (2013.01); *B01J 35/1019* (2013.01); *B01J 35/1061* (2013.01); *B01J 37/036* (2013.01); *B01J 37/349* (2013.01); *C01B 3/38* (2013.01); *C01B 3/48* (2013.01); *C01B 3/586* (2013.01); *C01B 2203/0233* (2013.01); *C01B 2203/0238* (2013.01); *C01B 2203/0244* (2013.01); *C01B 2203/025* (2013.01); *C01B 2203/0283* (2013.01); *C01B 2203/0445* (2013.01); *C01B 2203/047* (2013.01); *C01B 2203/066* (2013.01); *C01B 2203/1241* (2013.01); *C01B 2203/1258* (2013.01); *Y02E 60/50* (2013.01)

(56) References Cited

U.S. PATENT DOCUMENTS

| | | | | |
|---|---|---|---|---|
| 5,478,791 | A * | 12/1995 | Baldauf et al. | 502/337 |
| 5,525,211 | A * | 6/1996 | Sudhakar et al. | 208/217 |
| 7,118,717 | B2 * | 10/2006 | Shore | 422/626 |
| 7,384,986 | B2 * | 6/2008 | Huang et al. | 518/715 |
| 2002/0048542 | A1 | 4/2002 | Deeba et al. | 423/239.1 |
| 2004/0229036 | A1 * | 11/2004 | Gottfried et al. | 428/401 |
| 2006/0216227 | A1 * | 9/2006 | Idem et al. | 423/651 |
| 2008/0024563 | A1 * | 1/2008 | Matsui et al. | 347/70 |
| 2008/0090071 | A1 * | 4/2008 | Valle et al. | 428/336 |
| 2008/0226899 | A1 | 9/2008 | Suetsuna et al. | |

FOREIGN PATENT DOCUMENTS

| | | |
|---|---|---|
| JP | 3-93602 A | 4/1991 |
| JP | 6-134305 A | 5/1994 |
| JP | 2869525 B2 | 3/1999 |
| JP | 2001-240402 A | 9/2001 |
| JP | 2001-278656 A | 10/2001 |
| JP | 2002-126531 A | 5/2002 |
| JP | 2004-18361 A | 1/2004 |
| JP | 2004-57963 A | 2/2004 |
| JP | 2005-238131 A | 9/2005 |
| JP | 2006-62934 A | 3/2006 |
| JP | 2006-239551 A | 9/2006 |
| JP | 2006-327904 A | 12/2006 |
| JP | 3865479 B2 | 1/2007 |
| JP | 2007-203129 A | 8/2007 |
| JP | 2007-252988 A | 10/2007 |
| JP | 2007-252991 A | 10/2007 |
| JP | 2008-104906 A | 5/2008 |
| JP | 2008-227067 A | 9/2008 |
| JP | 4221498 B2 | 2/2009 |
| WO | WO 2006/073357 A1 * | 7/2006 |

OTHER PUBLICATIONS

Machine translation of JP 2007-252991 A, which was published Oct. 4, 2007.*
Machine trnaslation of JP 2006-327904 A, which was published Dec. 7, 2006.*
Kraus et al., Synthesis and magnetic properties of Ni-Al2O3 thin films, 1997, Journal of Applied Physics, 89, 1189-1195.*
Breval et al., Sol-gen prepared Ni-alumina composite material Part II Structure and hot-pressing temperature, 1992, Journal of Materials Science, 27, 5463-5469.*
A;-Ubaid et al., Steam Reforming of Methane on Reduced Non-Stiociometric Nickel Aluminate Catalysts, 1988, Applied Catalysis, 40, pp. 73-85.*
Dagle, R.A. et al., "Selective CO methanation catalysts for fuel processing applications", Applied Catalysis A: General, Jul. 15, 2007, vol. 326, No. 2, pp. 213-218.
PCT/ISA/210—International Search Report dated Jun. 15, 2010 for PCT/JP2010/054279.
Toshihiro Miyao et al., "Highly active and selective catalysts for hydrogen production and purification prepared by the solution-spray plasma technique", Catalyst, Mar. 10, 2009, vol. 51, No. 2, pp. 135-137, ISSN:0559-8958.
Watanabe, M. et al., "Nano-sized Ni particles on hollow alumina ball: Catalysts for hydrogen production", Applied Catalysis B: Environmental, Feb. 15, 2007, vol. 71, No. 3-4, pp. 237-245.
Japanese Office Action, dated Nov. 19, 2013, for Japanese Application No. 2011-510261 with an English translation.
Morris et al., "Ordered Mesoporous Alumina-Supported Metal Oxides", J. Am. Chem. Soc., vol. 130, No. 45, 2008, pp. 15210-15216.

* cited by examiner

SELECTIVE CO METHANATION CATALYST, METHOD OF PRODUCING THE SAME, AND APPARATUS USING THE SAME

CROSS REFERENCE TO RELATED APPLICATIONS

This application is a Continuation-in-Part of copending Application No. PCT/JP2010/054279 filed on Mar. 9, 2010, which claims priority under 35 U.S.C. 119(a) to Patent Application No. 2009-106938 filed in Japan on Apr. 24, 2009. The entire contents of all of the above applications are hereby incorporated by reference into the present application.

BACKGROUND OF THE INVENTION

1. Field of the Invention

The present invention relates to a catalyst for selectively transforming carbon monoxide CO, which is generated as gas byproduct during production of hydrogen gas from a variety of hydrocarbon fuels such as natural gas, LPG, and kerosene, into methane $CH_4$, a method of producing and an apparatus using such a catalyst. The technique the present invention discloses, with which hydrogen rich gas with a CO concentration of 10 ppm or less can be generated stably and also a catalyst used therefor can be produced at low cost, is suitably applicable to, for example, fuel reformers in home-use power generation systems using a polymer electrolyte fuel cell.

2. Description of the Related Art

Since polymer electrolyte fuel cells operate at low temperature of around 80 degrees C., if hydrogen rich gas serving as fuel contains carbon monoxide (hereinafter referred to as CO) at a certain level or higher, the anode platinum catalyst undergoes CO poisoning, suffering from a problem of reduction in the power generation capacity and finally making power generation impossible.

In order to avoid CO poisoning, in home-use polymer electrolyte fuel cell power generation systems using hydrogen rich gas transformed from utility gas, LP gas, kerosene, or the like by a fuel reformer, it is desirable to keep the CO concentration of gas incoming into the anode of the fuel cell constantly at 10 ppm or less. Many actual systems, in which generated gas is mixed with air in the final stage of the fuel reforming process, employ a selective CO oxidation catalyst for oxidizing CO contained in the gas to $CO_2$.

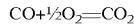  (Reaction Formula 1)

Although the CO concentration of gas incoming into a selective CO oxidation catalyst is often designed to be within the range from 0.5 to 1.0%, it is difficult, with the performance of existing selective CO oxidation catalysts, to ensure that the CO concentration is 10 ppm or less throughout the life of the system. In addition, the rate of CO selection of existing catalysts is not 100% and supplied air (oxygen) is also consumed partially in the oxidation of hydrogen, suffering from an essential problem in that the CO concentration is not lowered sufficiently but hydrogen is wasted.

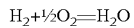  (Reaction Formula 2)

Most actual systems address the problem by providing selective CO oxidation catalyst layers in multiple stages and distributing and supplying air to each catalyst layer stage in an amount 1.5 to 3 times as large as stoichiometrically required to oxidize CO entirely, as disclosed in Japanese Patent No. 2869525 and Japanese Patent Application Laid-Open Publication No. 2001-240402, for example. This selective CO oxidation catalyst multi-staging (doubling typically) technique requires not only double amount of a selective CO oxidation catalyst containing a noble metal, but also an air supply pump, a control system therefor, and further a structure for mixing supplied air and reaction gas homogeneously in each stage, resulting in a significant increase in the cost for accessories, materials, and processing. This also leads to an increase in the size and capacity of fuel reformers.

Besides using a selective CO oxidation catalyst as above, there has also been proposed using a selective CO methanation catalyst as disclosed in Japanese Patent Application Laid-Open Publication No. Hei 3-93602, Japanese Patent Application Laid-Open Publication No. 2007-252988, and Applied Catalysis A, 326 (2007) 213-218 (Robert A. Dagle et al), for example. Further, Japanese Patent No. 3865479 discloses combining a selective CO oxidation catalyst with a selective CO methanation catalyst. Japanese Patent Application Laid-Open Publication No. 2007-203129 discloses a method of producing various high-activity and highly-durable catalysts for production of hydrogen using atmospheric-pressure plasma, but makes no mention of a selective CO methanation catalyst. Since selective CO methanation catalysts cause CO to react with $H_2$ to be $CH_4$, which is harmless to platinum electrode catalysts, there is no need to use a pump for supplying air externally, having the great cost advantage that the reformer can have a simple and small structure.

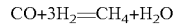  (Reaction Formula 3)

However, CO methanation reaction involves $CO_2$ methanation reaction as a side reaction.

Since $CO_2$ exists in hydrogen rich gas at a concentration higher than that of CO, $CO_2$ methanation reaction would unpreferably consume large amounts of hydrogen.

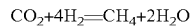  (Reaction Formula 4)

Therefore, selective CO methanation catalysts are required to have a high methanation activity for CO but a low methanation activity for $CO_2$ (i.e. have a high CO selectivity). In addition, a so-called reverse water-gas-shift reaction, in which $CO_2$ reacts with $H_2$ to be CO, is unignorable at high temperature and required to be suppressed.

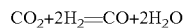  (Reaction Formula 5)

Most of previously reported selective CO methanation catalysts have a temperature range of no more than about 30 degrees C. and, at the widest, 50 degrees C., within which a high CO activity and a high CO selectivity are satisfied simultaneously. Thus, such catalysts are not necessarily stable to unexpected systemic condition changes, which may cause the outgoing CO concentration to increase and/or the temperature of catalyst layers to rise rapidly as a result of $CO_2$ methanation reaction, an exothermic reaction, to be uncontrollable. Selective CO methanation catalysts still cannot solve these critical problems that affect the reliability of systems. There are few reports showing that selective CO methanation catalysts have been employed on practical systems, though potentially capable of significantly reducing the cost for power generation systems.

Here will be described in further detail the reason why existing selective CO methanation catalysts could not necessarily ensure the reliability of systems sufficiently. In order to reduce CO with a concentration of 1% incoming into a selective CO methanation catalyst to achieve an outgoing CO concentration of 10 ppm or less, the catalyst is required to constantly have a conversion efficiency of 99.9% or more. Even if the incoming CO concentration may be reduced by half to 0.5%, the catalyst is still required to have a high conversion efficiency of 99.8% or more. Although the catalyst itself intrinsically has a high activity, changes in operating conditions that can naturally occur in actual reaction processes, that is, even a slight fall in the temperature and/or a slight increase in the incoming CO concentration could have a substantial impact on the increase in the outgoing CO concentration under operational circumstances with such an ultimate conversion efficiency. Particularly, in the case of an operation near the lower limit of the temperature window of the catalyst, this will lead to a fatal result.

On the other hand, since CO methanation reaction is likely to proceed at higher temperature, only such a fall in the temperature and/or an increase in the incoming CO concentration as mentioned above are less likely to cause the outgoing CO concentration to increase rapidly on the high-temperature side of the temperature window. $CO_2$ methanation reaction and reverse water-gas-shift reaction are rather major influences on the high-temperature side. A rise in the temperature of catalyst layers, if occurred for some reason, would suffer from a problem in that these two side reactions consume large amounts of $H_2$. In addition, the heat of CO methanation reaction added with that of $CO_2$ methanation reaction would cause a rapid rise in the temperature of catalyst layers, which may finally lead to loss of control of the reactor due to temperature runaway. This phenomenon might cause irreparable damage on the catalyst performance and the reactor.

In order to solve these practical problems, a selective CO methanation catalyst is desirable with which the activity of CO methanation reaction is improved significantly in the low-temperature range and the temperature at which $CO_2$ methanation reaction and reverse water-gas-shift reaction, side reactions on the high-temperature side, start to occur is made further higher to dramatically expand the temperature window for stable operations.

SUMMARY OF THE INVENTION

Under such circumstances, the inventors have devoted themselves to solving the above-described problems to consequently find that impregnating a nickel-aluminum composite oxide precursor of a nonstoichiometric composition prepared by the solution-spray plasma technique, in which fine droplets of raw material salt solution is sprayed into plasma, with a ruthenium salt to be supported and performing reduction treatment allows CO methanation reaction to selectively proceed even in the high-temperature range in which $CO_2$ methanation reaction and reverse water-gas-shift reaction proceed preferentially with conventional catalysts. The inventors have further found that selective CO methanation reaction occurs reproducibly with another nickel-aluminum composite oxide precursor or an additive metallic species. The inventors have also found that the low-temperature activity and selectivity of CO methanation reaction can be improved through steps different from conventional catalyst production processes in producing such a catalyst material. Moreover, besides these inventions relating to a new catalyst material and production process, the inventors have also found that applying the resulting catalyst material to a reactor not in a conventional granular form but in a honeycomb shape allows the temperature window the catalyst material has to be utilized most effectively.

Features of the present invention will hereinafter be described based on the new findings above.

The present invention is directed to a selective CO methanation catalyst supported on a composite oxide precursor containing at least nickel and aluminum of a nonstoichiometric and substantially uniform composition, in which metal nickel particles disperse (precipitate) on the support surface of the precursor.

The composite oxide precursor containing nickel and aluminum may be noncrystalline or may be a spherical particle with a diameter of 3 to 12 nm or a hollow spherical particle with a diameter of 0.1 to 2 μm.

The composite oxide precursor containing nickel and aluminum may be a mesoporous material.

Meanwhile, the selective CO methanation catalyst according to the present invention may be arranged such that the nickel particles each contain a metallic species which can promote reduction of oxide (or have an oxide reductive capacity) as metal and/or alloy, the species being capable of reducing a metal oxide easily in a flow of gas such as hydrogen.

The metallic species which can promote reduction of oxide preferably includes at least one selected from the group consisting of ruthenium, platinum, palladium, rhodium, iridium, and osmium.

Also, the selective CO methanation catalyst according to the present invention preferably has a $CO_2$ chemical adsorption capacity per unit weight of catalyst powder of 60 μmol/g-cat or less.

The catalyst according to the present invention may be arranged such that the temperature window within which the rate of selective CO methanation is 99.9% or more lies within the range from 50 degrees C. to less than 120 degrees C.

The selective CO methanation catalyst is preferably coated on a ceramic or metal honeycomb base material.

The present invention is also directed to a method of (process for) producing a selective CO methanation catalyst including the steps of: preparing a composite oxide precursor containing at least nickel and aluminum of a nonstoichiometric composition; and heating the precursor at a temperature of 200 to 700 degrees C. under a reductive gas atmosphere to cause metal nickel particles to disperse on the surface of the precursor. The production process preferably further includes the step of shaping the produced catalyst powder into grains or a plate or coating onto a honeycomb base material.

The step of preparing a composite oxide precursor may include the step of fast-heat-treating fine droplets of metal salt solution under atmospheric plasma or low-pressure (high-frequency or radio frequency) plasma.

Further, the step of preparing a composite oxide precursor may include a sol-gel step, a hydrothermal synthesis step, or a vapor deposition step for forming a mesoporous material.

The production process may further include the step of impregnating the precursor with raw material salt solution of a metal having an oxide reductive capacity prior to the step of heating the precursor under a reductive gas atmosphere.

The present invention is further directed to a hydrogen producing apparatus and/or a hydrogen purifying apparatus (hereinafter referred to as "producing and purifying apparatus") for use in a polymer electrolyte fuel cell, the apparatus being provided with such a selective CO methanation catalyst as described above. Apparatuses for producing hydrogen rich gas from hydrocarbon fuel such as natural gas, LPG, or kerosene implement processes utilizing various reactions, to any of which a honeycomb with a selective CO methanation catalyst coated thereon is applicable if it is necessary to remove CO byproduct. Among them, a honeycomb with a selective CO methanation catalyst coated thereon is suitably usable in processes in which hydrocarbon fuel such as natural gas, LPG, or kerosene is transformed into low-purity hydrogen through steam reforming, dry reforming, partial oxidation, autothermal reforming, or a combination thereof and the resulting CO byproduct is reacted with water through, for example, high-temperature shift reaction and/or low-temperature shift reaction to increase the hydrogen concentration so that the CO concentration is finally reduced to ppm order.

It is further preferred that the honeycomb is divided into multiple stages in the direction of gas flow and a space for gas mixing is provided between each pair of the divided honeycombs.

In short, the selective CO methanation catalyst according to the present invention offers the advantage that carbon monoxide can be removed efficiently and economically without adding particular reaction gas externally.

Selective CO oxidation catalysts, which are currently used to reduce the CO concentration to ppm order, require air to be added thereto to proceed with Reaction Formula 1, as disclosed in Japanese Patent No. 2869525. In particular, catalysts are required to have a rate of CO removal of 99.9% or more for use as fuel in polymer electrolyte fuel cells. As mentioned above, many fuel reformers have catalyst layers provided in two stages to achieve this rate of removal. This requires a high-capacity pump to supply air.

The selective CO methanation catalyst according to the present invention removes CO with $H_2$ existing in fuel gas, thereby requiring no air to be supplied and therefore a large air pump and a flow rate regulator, which are indispensable with selective CO oxidation catalysts, resulting in a significant reduction in the system cost. Requiring no air to be added advantageously and additionally results in requiring no given space having a complex structure, which has conventionally been provided in a fuel reformer for selective CO oxidation catalysts to mix air and reaction gas therein. This allows the cost of materials and production to be reduced significantly. Although conventional reformers using a two-staged selective CO oxidation catalyst have a volume of about 20 liters, employing the selective CO methanation catalyst according to the present invention easily allows the fuel reformer to have a volume reduced to two-third, which further improves the transportability and installability of the system.

Selective CO methanation catalysts have been reported in the past. However, the selective CO methanation catalyst disclosed in Japanese Patent Application Laid-Open Publication No. Hei 3-93602 only treats gas with a low CO concentration of 60 ppm, while the selective CO methanation catalyst disclosed in Applied Catalysis A, 326 (2007) 213-218 treats gas with a high CO concentration of 1%, but the CO concentration after the treatment is not less than 10 ppm. In addition, the temperature window is practically desired to be further expanded. Both the selective CO methanation catalysts disclosed in Japanese Patent Application Laid-Open Publication Nos. Hei 3-93602 and 2007-252988 have an upper limit temperature of 200 degrees C. when applied with treatment gas. This indicates that in the temperature range higher than 200 degrees C., there are problems of a significant reduction in the $H_2$ concentration due to concurrent occurrence of side reactions indicated by Reaction Formulae 4 and 5 and a difficulty in system control such as thermal runaway, as described above.

On the other hand, the selective CO methanation catalyst according to the present invention achieves performance improvement by organizing a new catalyst material and an expanded usable temperature range of up to 100 degrees C. by suppressing side reactions at high temperature. Also, the upper limit temperature usable with no thermal runaway is over 300 degrees C. at the highest. These advantages dramatically facilitate apparatus control and make it possible to provide a stable and reliable apparatus having the risk of thermal runaway almost perfectly eliminated, which should never be allowed to carry as an apparatus that handles hydrogen.

Although not all mechanisms on which the advantages of the present invention are based have been clarified, ones clarified so far will hereinafter be described.

$NiAl_2O_4$ is well known as nickel-aluminum composite oxide, but one of the key factors of the catalyst according to the present invention is that an oxide of a nonstoichiometric composition in short of nickel compared to $NiAl_2O_4$ is used as a support. However, merely mixing nickel and aluminum raw materials at the nonstoichiometric composition of the present invention and burning it in air result in a heterogeneous oxide mixture of thermally-equilibrated $NiAl_2O_4$ and $Al_2O_3$ crystalline phases. The present invention is commonly characterized by, for example, fine particles formed by quickly heating and cooling mist produced from raw material salt mixed solution in plasma or plasma flame or a mesoporous material produced from a solution using a soft template, in both of which nickel and aluminum are in a nonstoichiometric composition but distributed substantially uniformly and noncrystalline. It is noted that the composite oxide of the present invention is noncrystalline and thereby referred to distinctively as "composite oxide precursor".

The present invention is additionally characterized in that the support has a high specific surface area that is maintained over the service temperature range of 150 to 300 degrees C. up to around 500 degrees C. This has a great effect on the occurrence of specific catalytic activities to be described hereinafter.

Although this feature of the support is a condition necessary for the occurrence of catalytic activities, it should be appreciated that the activities cannot be exhibited only with the support. Fine nickel particles dispersing (precipitating) on the support and/or added with a metal having an oxide reductive capacity (i.e., capable of promoting reduction of oxide) are absolutely considered to serve as active spots. Nickel particles having a methanation capacity specific to the present invention cannot be obtained through application on a so-called high-specific surface area support using a conventional impregnation technique or the like, but only by causing nickel particles to disperse directly from inside the structure of the above-described support "composite oxide precursor". The metal having an oxide reductive capacity causes nickel particles to disperse finely at low temperature from inside the structure of the "composite oxide precursor" in a flow of hydrogen. On the surface of the metal having an oxide reductive capacity, hydrogen $H_2$ is dissociatively-adsorbed to spill over the support surface as active hydrogen atoms H. Hydrogen atoms spilling over the support easily reduce the support to cause fine nickel particles to disperse from inside the structure thereof. During the dispersion of nickel particles, much of the added metal having an oxide reductive capacity forms solid solution, eutectics, or aggregates with dispersing nickel particles in accordance with its composition ratio to show an activity higher than that of sole nickel particles. These fine particles containing nickel show a thermal stability higher than that of nickel particles made to disperse with a common technique because they disperse from inside the structure of the support and thereby have a high adhesion and affinity at the interface with the support.

Japanese Patent Application Laid-Open Publication No. 2007-203129 discloses a process for introducing droplets with a diameter of 30 μm or less containing nickel and ruthenium or platinum as catalytic active components and aluminum as a support component into atmospheric plasma flame to obtain a steam reforming catalyst. This process is not intended to be used to obtain selective CO methanation catalysts. In addition, the disclosed technique differs substantially from the present invention in that solution in which all components including not only support but also active ones are dissolved is used as a starting material to synthesize a finely-powdered catalyst. In the thus synthesized finely-powdered catalyst, since ruthenium, for example, which corresponds to the "composite oxide precursor" of the present invention, is included in oxides of other components, it is difficult to cause nickel particles to disperse finely at low temperature from inside the structure of the "composite oxide precursor" even if may subsequently be heat-treated under a reductive gas atmosphere. A high-temperature heat treatment could cause ruthenium included to partially disperse diffusively on the outer surface of fine particles. However, the high temperature causes the thus dispersing ruthenium particles to grow bigger to thereby have a poor nickel reductive dispersion function. In addition, the reductively-dispersing nickel itself is also exposed to high temperature to aggregate and have a large particle size, whereby high selective CO methanation activities cannot be expected.

The metal having an oxide reductive capacity can easily reduce the support at low temperature to cause high-activity fine nickel particles to disperse. This mechanism allows the catalyst according to the present invention to show a notably high low-temperature activity. At the same time, the metal having an oxide reductive capacity has a feature of considerably suppressing $CO_2$ methanation reaction, a side reaction in high temperature range. For example, it is observed that the amount of $CO_2$ chemical adsorption decreases in approximate proportion to the support amount of Ru metal. This is for the reason that when the "composite oxide precursor" support is brought into contact with solution of a metal salt having an oxide reductive capacity, metal ions are selectively adsorbed on sites of the support to which $CO_2$ is likely to be adsorbed, which leads to a structural change for inhibiting $CO_2$ chemical adsorption through subsequent reduction treatment, for example.

The foregoing mechanism of "metal having an oxide reductive capacity" (metal which can promote reduction of oxide) with respect to "composite oxide precursor" allows the selective CO methanation catalyst to offer advantages as a material. This material may specifically be formed and processed into, for example, a spherical, cylindrical, or chip-like shape for use. However, if the catalyst is coated and used on a honeycomb base material made of cordierite or metal such as SUS, two mechanisms to be describe hereinafter allow the service temperature range of the catalyst to expand more effectively.

One of the two mechanisms is based on the fact that the same level of performance can be achieved with the use of an overwhelmingly lower amount of honeycomb catalyst than granular catalyst regardless of what the honeycomb base material is made of. In the case of filling the same volume, honeycomb catalysts can have a larger area of contact with reaction gas than granular catalysts. In addition, for performance reason, the thickness of the catalyst layer coated on the surface of the honeycomb base material is only required to have several hundreds of micrometers. Therefore, the same level or higher performance can be achieved with the use of honeycomb catalysts in an amount $1/5$ to $1/10$ as low as that for granular catalysts. This offers not only economic but also the great advantage of suppressing the occurrence of hotspots that easily lead to thermal runaway. This is for the reason that honeycomb catalysts exist in a far lower amount per unit volume and, with being formed in a thin layer, constantly dissipate heat via reaction gas.

The other of the two mechanisms is particularly prominent in metal honeycomb base materials. Metal honeycombs have a higher thermal conductivity, particularly in the direction perpendicular to that of gas flow, than ceramic honeycombs such as cordierite. Further, using the outer peripheral portions of metal honeycombs also as the wall of the reaction container leads to the heat-transfer (heat-dissipation) effect thereof greatly exceeding that of granular catalysts. This allows the service temperature range of the catalyst according to the present invention to expand to high temperature due to the inherent performance of the material and the added heat-dissipation effect of honeycombs.

Meanwhile, unlike granular catalysts, producing and using honeycomb catalysts includes things to keep in mind. This is that the performance variation among honeycomb pores (hereinafter referred to as cells) through which gas flows should be reduced to as small as possible. The rate of reaction of granular catalysts is never influenced even if one of a hundred particles may be completely defective. This is for the reason that in granular catalysts, since gas incoming into catalyst layers flows therethrough while mixed with other gases, the gas, even if may come into contact with a defective catalyst particle, will be in contact with other particles to proceed with its reaction. However, the rate of reaction of honeycomb catalysts decreases definitely by 1% if one of a hundred cells shows no catalytic activity. This is for the reason that gas, once incoming into a cell with no catalytic activity, cannot flow into other cells. This problem can be avoided by dividing the honeycomb into multiple stages in the direction of gas flow and providing a space for gas mixing between each pair of the divided honeycombs. Thus dividing the honeycomb makes the probability of the cells longitudinally divided being placed in exactly the same position in the divided honeycombs very low, even if both of the cells may be defective. Also, thus providing a space causes gas outgoing from a defective cell to be mixed with other gases and redistributed reliably to a non-defective cell in the next honeycomb catalyst. Employing such a structure allows production and operational problems that honeycomb catalysts fundamentally suffer from to be overcome easily without increasing the catalyst volume.

DESCRIPTION OF THE PREFERRED EMBODIMENT

Embodiments of the present invention will hereinafter be described.

[Overall Configuration of the System]

Figure 1:
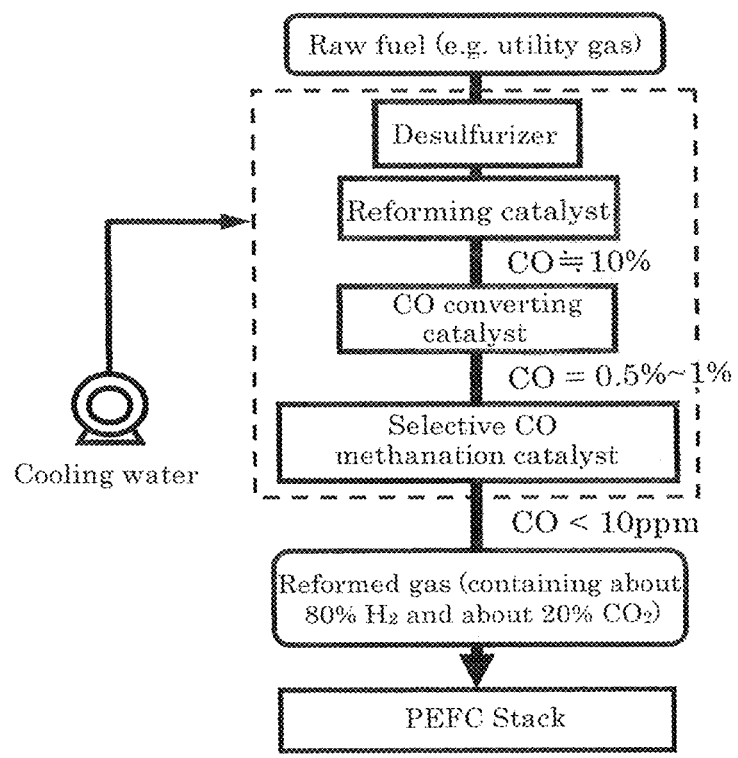
FIG. 1 schematically shows the overall configuration and flow of a hydrogen production system.

FIG. 1 schematically shows the overall configuration and flow of a system for producing and purifying high-concentration hydrogen gas from raw fuel (e.g. utility gas) to be supplied to fuel cells (e.g. polymer electrolyte fuel cells (PEFC stacks)). The section enclosed by the dashed line corresponds to a fuel processing apparatus in which raw fuel gas flows to pass through each catalyst layer and undergo reformation and CO removal (10 ppm or less) to be high-concentration hydrogen gas (reformed gas contains about 80% $H_2$ and about 20% $CO_2$).

The raw fuel gas flows first through a desulfurizer where sulfur components are removed, secondly a reforming catalyst layer where hydrogen ($H_2$) and carbon monoxide (CO) are generated through reforming reaction, and further a CO converting catalyst layer where CO is removed. This arrangement is the same as that of conventional apparatuses.

Gases containing about 0.5 to 1.0% CO ($H_2$, $CO_2$, etc.) flow into a selective CO methanation catalyst layer according to the present invention to be high-concentration $H_2$ gas (reformed gas) with a CO concentration of 10 ppm or less therethrough and supplied to a PEFC stack.

Figure 2A:
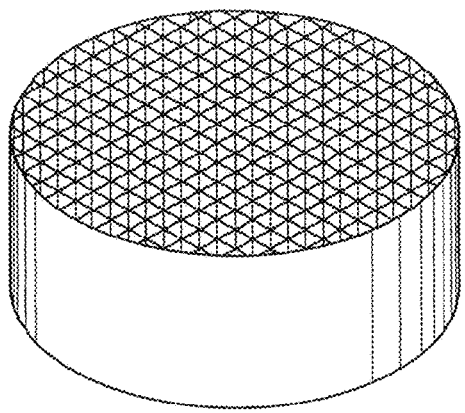
FIGS. 2a and 2b are perspective views showing exemplary honeycomb base materials (substrates)
Figure 2B:
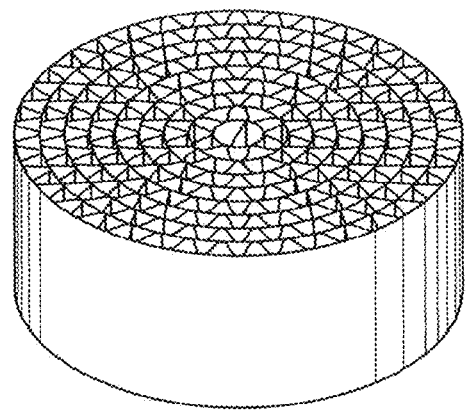

The selective CO methanation catalyst is preferably used in a manner coated on a honeycomb substrate (base material). FIGS. 2a and 2b show exemplary honeycomb base materials. FIG. 2a shows an exemplary cordierite honeycomb base material and FIG. 2b shows an exemplary metal honeycomb base material. In either case, many longitudinally-arranged matrix-like, diagonal, or waveform partition plates (partition walls) are provided in an intersecting manner inside a cylinder (circular, rectangular, etc.), where gases pass between adjacent partition plates. The surface of each partition plate is coated entirely with a selective CO methanation catalyst. Honeycomb structures having gas passages (flow paths) (cells) of hexagonal, quadrilateral, sinusoidal, or other shaped cross section are herein referred to merely as honeycomb or honeycomb base material.

Figure 3:
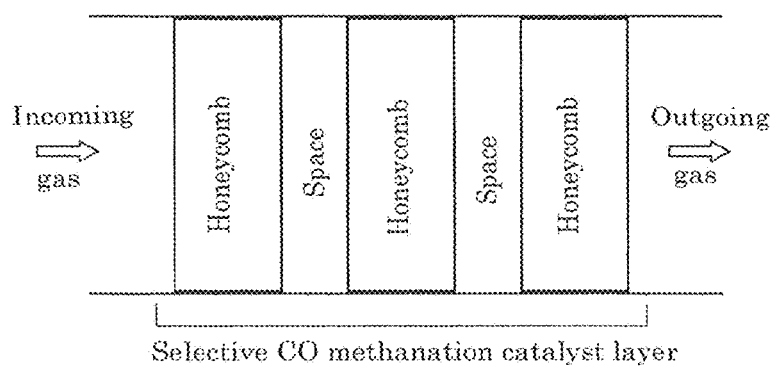
FIG. 3 shows the structure of a selective CO methanation catalyst layer in which honeycombs are arranged in multiple stages.

As shown in FIG. 3, multiple honeycombs with a selective CO methanation catalyst coated thereof are preferably arranged separately in multiple stages in the direction of gas flow in a reaction container.

The entire fuel processing apparatus shown in FIG. 1 or the section including the selective CO methanation catalyst layer shown in FIG. 3 may represent a hydrogen producing and purifying apparatus.

[Composite Oxide Precursor (Support)]

In the present invention, a composite oxide precursor containing nickel and aluminum is used as a support. This composite oxide precursor support is partially reduced to cause fine active species containing nickel to disperse.

The support has a molar ratio of nickel to aluminum (Ni/Al) of equal to or greater than 0.05 but less than 0.5, and preferably equal to or greater than 0.1 but less than 0.39. If the Ni/Al molar ratio is lower than this level, a smaller number of nickel particles will disperse through a process to be described hereinafter, which causes the catalytic activity to remain not high. On the other hand, if the Ni/Al molar ratio is in or around a so-called stoichiometric proportion of 0.5, dispersing nickel particles grow bigger. Also in this case, it is difficult to obtain a high catalytic activity.

A composite oxide precursor within an appropriate range of composition may be formed through a so-called dispersion process from raw material solution containing nickel and aluminum. However, hollow spherical particles with a diameter of 0.1 to 5 μm and a thickness of about 10 nm formed by air-flow introduction of fine droplets of raw material salt mixed solution into atmospheric plasma are desirable to obtain a high catalytic activity. Fine spherical particles with a diameter of 3 to 12 nm synthesized through a process of directly spraying raw material solution into low-pressure plasma also exhibit the same effect. These processes are preferable in that the raw material salt is quickly heated and cooled in high-temperature plasma and thereby an oxide of a nonstoichiometric composition is obtained with a more homogeneous composition and a higher specific surface area without containing specific crystalline phases. The catalytic activity is not considered here to depend directly on whether or not the particles are hollow but on the thickness thereof. That is, particles with a diameter of about 10 nm and ones with a greater diameter but a thickness of about 10 nm exhibit the same effect. The reason for this, which has not necessarily been clarified, is considered that spill-over of hydrogen due to metal addition affects the size of the reductively-dispersing nickel.

It is also possible to obtain a support that shows a high catalytic activity without using plasma. In particular, mesoporous materials having a regular fine pore structure are best suited for the support. Mesoporous materials containing aluminum and nickel within an appropriate range of composition can be produced through a sol-gel process from solution of aluminum alkoxide, nickel salt, and a surface-active agent. The thus produced composite oxide precursor has mesopores of a specific size and a specific surface area significantly higher than that of composite oxide precursors produced through another process. Catalysts produced using such a precursor result in having an expanded temperature window with a high low-temperature activity and high-temperature selectivity for CO methanation reaction. Precursors produced through a sol-gel process are characterized by having a molecularly homogeneous composition of nickel and aluminum, having a higher specific surface area with no fine crystalline phase dispersing because no high temperature is applied thereto even a short period of time like plasma processes, and in that the wall thickness of the mesoporous structure, which corresponds to the particle size in plasma processes, is sufficiently small in sub-nanometer order.

[Active Metal Dispersion]

The selective CO methanation catalyst can be obtained by heat-reducing the composite oxide precursor support in a flow of reductive gas such as hydrogen and causing fine nickel particles to disperse. In this case, it is important that the resulting nickel particles exist as fine particles on the surface of the support. The particle size is preferably within the range of 1 to 20 nm, and particularly 1 to 5 nm.

The composite oxide precursor support being in a nonstoichiometric composition in short of nickel relative to aluminum is considered to allow reductive dispersion (precipitation) of fine nickel particles to occur easily. As another technique for allowing reductive dispersion of fine nickel particles to occur more easily, it is effective to support a metal having an oxide reductive capacity. This can be achieved through an impregnation process in which support powder is impregnated with a center amount of raw material salt solution containing at least one of ruthenium, platinum, palladium, rhodium, iridium, and osmium, and then burned. These are noble metals and ruthenium is preferable from a view point of both economy and efficacy. The ruthenium support ratio is preferably within the range of 0.2 to 5 wt %, and particularly 0.5 to 3 wt % as Ru metal. The low-temperature activity of CO methanation reaction shows a tendency to become higher with an increase in the support amount of ruthenium but, in turn, become lower with an excessive increase in the support amount of ruthenium. This is considered to be due to the fact that an excessive amount of reductively-dispersing nickel causes nickel particles to aggregate and grow bigger accordingly.

In the process of impregnation with ruthenium, the support is impregnated with ruthenium salt solution and then dried and burned in air. After that, under a reductive atmosphere, the ruthenium partially exists as ruthenium metal, while the other part is diffusively mixed in reductively-dispersing nickel to exist as alloy. The ruthenium metal itself has a melting point of 2000 degrees C. or higher, but ruthenium oxide existing under an oxidative atmosphere is said to have a low melting point to be sublimatable. From this point of view, not oxidizing and burning in air but reducing directly under a reductive gas atmosphere such as hydrogen after drying leads to a refinement of nickel with the same support amount of ruthenium and therefore a higher low-temperature activity. That is, only a smaller support amount of ruthenium is required to achieve the same low-temperature activity.

Meanwhile, it is good that $CO_2$ methanation reaction, a side reaction, is suppressed as the support amount of ruthenium increases. This is considered to be due to the fact that during impregnation, ruthenium ions are selectively adsorbed on sites to which $CO_2$ is likely to be adsorbed to suppress $CO_2$ methanation reaction, as mentioned above. Since the factors defining the respective low- and high-temperature sides of the temperature window thus show their respective different trends depending on the ruthenium support ratio and the trends also vary depending on the surface area and form of the support, it is not necessarily logical to uniformly define an optimum support amount of ruthenium. However, based on the test results obtained so far, it is possible to achieve a relatively stable activity by keeping the support amount of ruthenium within the foregoing range. Ruthenium typically originates and may be selected from, for example, $RuCl_3.nH_2O$, $Ru(NO_3)_3$, or $Ru(NO)(NO_3)$. $RuCl_3.nH_2O$ is most preferable among them.

Comparatively evaluating the effect of ruthenium on the suppression of $CO_2$ adsorption based on the amount of chemical adsorption of $CO_2$ per unit weight of catalyst powder obtained using the pulse adsorption technique, the catalyst shows an adsorption amount of 3 μmol/g-cat at the smallest and of 57 μmol/g-cat at the largest. On the other hand, commercially available Ni-supported alumina catalysts, which have little CO selectivity, show an apparently different adsorption amount of 128 μmol/g-cat.

Although the impregnation process is used to support a metal species for oxide reduction in the examples above, the process for supporting a metal species is not limited to impregnation. Various supporting processes may be applied including causing fine metal or alloy particles to directly disperse on the support.

The resulting catalyst powder may be used in a granular form but, in order to deliver its performance as a selective CO methanation catalyst more effectively, preferably used from a view point of performance in a manner coated on a honeycomb base material made of ceramics such as cordierite or metal such as stainless steel. The catalyst powder is added with alumina or silica series sol and water as a binder, and then pulverized and mixed in a ball mill to produce a slurry with a density and a viscosity appropriate for coating. This slurry is poured into each cell of a ceramic or metal honeycomb base material that has preliminarily been immersed in water so that the surface thereof gets wet. After excess slurry is removed, the material is dried and burned in an electric furnace. This procedure is repeated until the material has an appropriate coating weight.

Alternatively, slurry of the composite oxide precursor may preliminarily be coated on a honeycomb in the same way, and thereafter the entire honeycomb may be impregnated with solution of a metal salt such as ruthenium so that the metal for oxide reduction is supported. In general, the latter technique, in which solution of a noble metal such as ruthenium can be used efficiently with no loss, is effective from a view point of mass production.

The operating temperature of the honeycomb-type selective CO methanation catalyst according to the present invention may be controlled to be within the range of equal to or higher than 50 degrees C. but lower than 120 degrees C. Further, the honeycomb may be divided into two to four pieces in the direction of gas flow with no increase in the honeycomb capacity, and a space for gas mixing may be provided between each pair of the divided honeycombs to achieve stable operations.

Practical examples of the present invention will hereinafter be described.

First Practical Example

As an exemplary technique for synthesizing a composite oxide precursor necessary for preparation of the catalyst according to the present invention, first will be described the low-pressure spray plasma technique.

In this technique, a low-pressure (high (radio)-frequency) thermal plasma apparatus was used. As raw material solution, 4.67 g of nickel nitrate hexahydrate $Ni(NO_3)_2.6H_2O$ and 17.66 g of aluminum nitrate nonahydrate $Al(NO_3)_3.9H_2O$ were dissolved in 100 mL of distilled water to prepare mixed solution with a Ni/Al molar ratio of 0.34. This mixed solution was sprayed and introduced with argon mixed gas containing 5% oxygen into an argon plasma torch that was fired at an output power of 100 kW and a frequency of 4 MHz in a low-pressure atmosphere apparatus. Powder generated via the plasma torch was collected through a filter. This procedure was repeated until a total weight of 500 g of powder is obtained. The collected powder was dark green fine powder obtained at a yield of about 70%. As a result of analysis using an energy dispersive X-ray analyzer (EDX), the Ni/Al molar ratio of the powder was found 0.29. As a result of X-ray diffraction (XRD) measurements, no intense diffraction peak was observed that attributes to $NiAl_2O_4$ or $Al_2O_3$ crystal. As a result of observations using a transmission electron microscope (TEM), the particle size had a distribution range of 3 to 12 nm.

Second Practical Example

This practical example discloses a technique of producing composite oxide precursor powder using a plasma apparatus different from that used in the first practical example. The same raw material mixed solution as the first practical example was used, but the interior of the plasma apparatus was under atmospheric pressure, which was different from the first practical example. The apparatus used included three sections: a raw material solution spraying section, a plasma section, and a particle collecting section. In the raw material solution spraying section, mixed solution of nickel nitrate and aluminum nitrate prepared at the same concentration and molar ratio as in the first practical example was used to generate droplets with a size of 2 to 3 μm using an ultrasonic atomization unit (HM-303N from HONDA ELECTRONICS, Co., Ltd.) and introduced with Ar carrier gas containing 5% $O_2$ into the plasma section. An atmospheric plasma generating apparatus (from ARIOS Inc.) having an output power of 1 kW and a frequency of 2.45 GHz was used to generate plasma. In the plasma section, raw material salt components in sprayed droplets were thermally decomposed to generate fine particles. In the particle collecting section, the generated fine particles were collected with pure water sprayed in a shower manner using a water circulating pump (from IWAKI Co., Ltd.). Particles that slipped through the section were collected in the subsequent secondary trap using a technique of bubbling into water.

The fine particles collected through these traps were suction-filtered through a membrane filter with a pore size of 0.025 μm (cellulose mixed ester from MILLIPORE Ltd.) and dried for about eight hours at 60 degrees C. to obtain powder. The rate of collection of powder to an input material was about 89.7% on a metal basis.

As a result of observations using a scanning electron microscope (SEM), it was found that many spherical particles with a size of about 1 to 3 μm were mainly generated. As a result of composition analysis using an energy dispersive X-ray analyzer (EDX), the Ni/Al molar ratio was found 0.29, where NiO and $Al_2O_3$ accounted, respectively, for 30.4% and 69.6%. As a result of XRD measurements, it was also found that the prepared powder showed weak broad indications at diffraction angles assumed to correspond to $NiAl_2O_4$ and $Al_2O_3$, but no intense crystalline peak was observed, that is, the powder was almost entirely amorphous. As a result of observations using a TEM, most of the particles were hollow and formed in a thin film having a thickness of a few nanometers, which was different from the first practical example in which fine solid particles were obtained.

Third Practical Example

This practical example discloses a preferred technique of producing a composite oxide precursor without using plasma like in the first and second practical examples.

Solution A prepared by dissolving and stirring 2.0 g of triblock copolymer of a non-ionic surface-active agent P123 ($EO_{20}PO_{20}EO_{20}$) into 20 mL of ethyl alcohol was mixed with solution B prepared by dissolving aluminum isopropoxide (equivalent to 18 mmol of Al element) and nickel nitrate (equivalent to 2 mmol of Ni element) into 3.2 mL of nitric acid and 20 mL of ethyl alcohol, and stirred for five hours at room temperature to obtain a sol. This sol was dried for twenty hours at 60 degrees C. to obtain a gel, and the gel was further heated up to 400 degrees C. at a rate of temperature rise of 1 degree C./min in a muffle furnace and then kept at the temperature for four hours.

The thus obtained powder was formed as a mesoporous material having a BET surface area of 350 $m^2$/g and a pore size of 6.9 nm. Using a scanning transmission electron microscope (STEM), a hexagonal ordered honeycomb structure and a columnar mesoporous structure were observed, respectively, in the [001] and [110] directions. As a result of EDX analyses conducted at the same time, Ni and Al were distributed uniformly and the Ni/Al molar ratio agreed well with the preparation value Ni/Al=0.11 (10/90). In diffraction images of 2θ=20 to 80 degrees obtained using an X-ray diffractometer, no especially intense diffraction peak was observed. Only a weak broad peak was observed at a diffraction angle corresponding to $NiAl_2O_4$.

In not only the case of a Ni/Al molar ratio of 0.11 but also the case of 0.25 (20/80) and 0.33 (25/75), powder samples were prepared in the same way and it was confirmed that mesoporous materials were formed.

Fourth Practical Example

This practical example discloses a case of using the same composite oxide precursor powder as in the first to third practical examples and supporting ruthenium as a metal having an oxide reductive capacity. Ruthenium salt used in this practical example was ruthenium chloride.

First, 8.0 g of the same composite oxide precursor powder as in the first practical example was added with 100 g of deionized water and stirred for ten minutes. Ruthenium chloride (III) n-hydrate ($RuCl_3 \cdot nH_2O$ from KANTO CHEMICAL Co., Inc. with a Ru content of 40 wt %) was weighed so that the metal ruthenium content after supporting was 1 wt %, and added with 28 g of deionized water, and then stirred for ten minutes. This ruthenium chloride solution was added entirely to the prepared suspension of the composite oxide precursor using a burette in about twenty minutes, and then further stirred for ten minutes. The resulting suspension was introduced into an eggplant-shaped flask and stirred for thirty minutes in hot water at 35 to 40 degrees C., and then once cooled down to room temperature and applied to an evaporator at 35 to 40 degrees C. to evaporate moisture. The resulting powder was dried overnight at 120 degrees C. and then burned for five hours in air at 500 degrees C.

Similarly, using the same composite oxide precursor powder as in the first practical example, samples with a ruthenium content of not only 1.0 wt % but also 0.2 wt %, 0.5 wt %, 2.0 wt %, and 3.0 wt % were prepared.

Fifth Practical Example

This practical example discloses a technique of impregnating the same composite oxide precursor powder as in the first practical example with and supporting ruthenium from ruthenium nitrate. $Ru(NO_3)_3$ nitric acid solution (with a Ru content of 4.18 wt %) from FURUYA METAL Co., Ltd. was used as the ruthenium nitrate. First, 8.0 g of the composite oxide precursor powder was added with 100 g of deionized water and stirred for ten minutes. Ruthenium nitrate in an amount with which the metal ruthenium content after supporting would be 0.5 wt % was added with 28 g of deionized water, and then stirred for ten minutes. This ruthenium nitrate solution was added entirely to Ni/$Al_2O_3$(N) solution using a burette in about twenty minutes, and then further stirred for ten minutes. The resulting suspension was introduced into an eggplant-shaped flask and stirred for thirty minutes in hot water at 35 to 40 degrees C., and then once cooled down to room temperature and applied to an evaporator at 35 to 40 degrees C. to evaporate moisture. The resulting powder was dried overnight at 120 degrees C. and then burned for five hours in air at 500 degrees C.

Sixth Practical Example

This practical example discloses a technique of using nitrosyl ruthenium nitrate (III) solution ($Ru(NO)(NO_3)_3$ solution from STREM CHEMICALS Inc. with a Ru content of 1.5 wt %) as a ruthenium salt.

First, 8.0 g of the same composite oxide precursor powder as in the first practical example was added with 100 g of deionized water and stirred for ten minutes. Similarly, nitrosyl ruthenium nitrate (III) in an amount with which the metal ruthenium content after supporting would be 1 wt % was added with 28 g of deionized water, and then stirred for ten minutes. This nitrosyl ruthenium nitrate (III) solution was added entirely to the suspension of the composite oxide precursor powder using a burette in about twenty minutes, and then further stirred for ten minutes. Thereafter, the resulting suspension underwent the same procedure as in the fifth practical example to evaporate moisture, and the resulting powder was dried and burned for five hours in air at 500 degrees C.

Seventh Practical Example

This practical example discloses a case of supporting platinum instead of ruthenium as a metal having an oxide reductive capacity. Platinum salt used in this practical example was tetraamine platinum dichloride solution ($Pt(NH_3)_4Cl_2$ solution from TANAKA HOLDINGS Co., Ltd. with a Pt content of 4.756 wt %).

First, 8.0 g of the same composite oxide precursor powder as in the first practical example was added with 100 g of deionized water and stirred for ten minutes. Similarly, tetraamine platinum dichloride in an amount with which the metal platinum content after supporting would be 1 wt % was added with 28 g of deionized water, and then stirred for ten minutes. The resultants were mixed and underwent the same procedure as in the fourth to sixth practical examples to obtain burned supporting powder.

Eight Practical Example

The catalyst powder obtained in the fourth to seventh practical examples were coated on a honeycomb base material and underwent reduction treatment using hydrogen gas and thereafter a catalytic activity evaluation. This practical example discloses a technique of coating on the honeycomb base material. The honeycomb was made of ceramic cordierite.

First, 3 g of the ruthenium supported powder prepared in the fourth practical example was added with 6 g of alumina sol (alumina sol 520 from NISSAN CHEMICAL INDUSTRIES, Ltd.) and 25 g of pure water, and then stirred and mixed to prepare a coating slurry. On the other hand, a cordierite honeycomb of 400 cpsi cut out for a gas passage with 12 mm square×30 mm of length was burned for one hour at 500 degrees C. to remove contained moisture completely. This honeycomb was immersed in the coating slurry, and then lifted up to remove excess slurry inside the catalyst and on the outer wall using an air pump. The coated honeycomb was burned for one hour in air at 500 degrees C. in an electric furnace and then weighed. This procedure was repeated until the net amount of coating reached 300 g per one liter of honeycomb to obtain a honeycomb catalyst with a catalyst layer formed uniformly on the inner wall of each cell. Similarly, the powder prepared in the fifth and sixth practical examples were coated to obtain a similarly uniform honeycomb catalyst.

The sample with a ruthenium content of 1.0 wt % prepared in the fourth practical example underwent the same procedure to produce a honeycomb catalyst with an amount of coating of 212 g per one liter of honeycomb.

Ninth Practical Example

In this practical example, a metal honeycomb was used instead of the cordierite honeycomb. The metal honeycomb was made of stainless steel (YUS205M1) with an outside diameter of 25.4 mm (1 inch φ) and a length of 15 mm from Nippon Steel Materials Co., Ltd., the surface thereof being oxidized at high temperature. The number of cells was 400 cpsi (cell per square inch) and the thickness of each cell wall was 30 µm. With the same procedure as in the eighth practical example, the powder with a Ru content of 1 wt % prepared in the fourth practical example was coated by 300 g/L. Compared to cordierite catalysts, since the metal honeycomb has a smaller cell wall thickness and not porous, the coating can proceed smoothly and the risk of obstruction of some cells during its production is small. The time required for coating by 300 g/L was about half that for cordierite honeycombs.

With the same procedure, three metal honeycombs with a larger diameter of 100 mmφ, a length of 20 mm, and a number of cells of 400 cpsi were coated. The amount of coating of the catalyst was 200 g/L on average. Neither obstruction of cells during the coating nor defective coating was observed, and good coating was confirmed with the naked eye.

Tenth Practical Example

The samples coated on the honeycombs underwent a catalytic activity evaluation in a fixed-bed atmospheric circulation-type reaction evaluating apparatus.

Reaction gases $H_2$, $CO_2$, and CO were introduced by a mass flow controller into a reaction tube. Ion-exchanged water was fed by a micro pump (from ATT MOL Inc.) into a vaporizer kept at 200 degrees C., and generated steam was introduced with $N_2$ carrier into the reaction tube. The reaction tube was made of quartz with an outside diameter of 20 mm (inside diameter of 18 mm). The honeycomb catalyst was set in a predetermined position at the center of the reaction tube, and the space between the inner wall of the reaction tube and the honeycomb was filled closely with silica wool so as to be fixed and that gas cannot flow through outside the honeycomb. In the case of cordierite honeycombs, sheathed thermocouples were set, respectively, at positions about 1 mm high and low from the honeycomb catalyst to measure the temperature of the catalyst layers. In the case of honeycomb catalysts, the tip end of the lower sheathed thermocouple was inserted to be placed at 2 to 3 mm in a cell.

Prior to reactions, the samples underwent hydrogen reduction. This was for reducing Ni, a catalytic activity component. During the reduction, $H_2$ gas was introduced through the reaction tube at a flow rate of 500 ml/min and heated up to 700 degrees C. at 20 degrees C./min, and thereafter kept at the temperature for one hour. After the reduction, $N_2$ gas was introduced for five minutes to purge $H_2$ gas. Next, after steam was introduced with $N_2$ carrier into the reaction tube for five minutes, reaction gas was introduced. The reaction gas had a composition of 1 vol % CO, 80 vol % $H_2$, and 19 vol % $CO_2$ on a dry basis, and the incoming CO concentration was evaluated even if may be equal to or lower than 1 vol %. Steam was added in an amount equivalent to steam/CO=15 (molar ratio).

Gases outgoing from the reaction tube, after contained moisture was removed at reduced temperature, were introduced into an online FID (from GL SCIENCE Co., Ltd.) including an online TCD gas chromatograph and a methanizer to undergo analysis of generated gases.

Figure 4A:
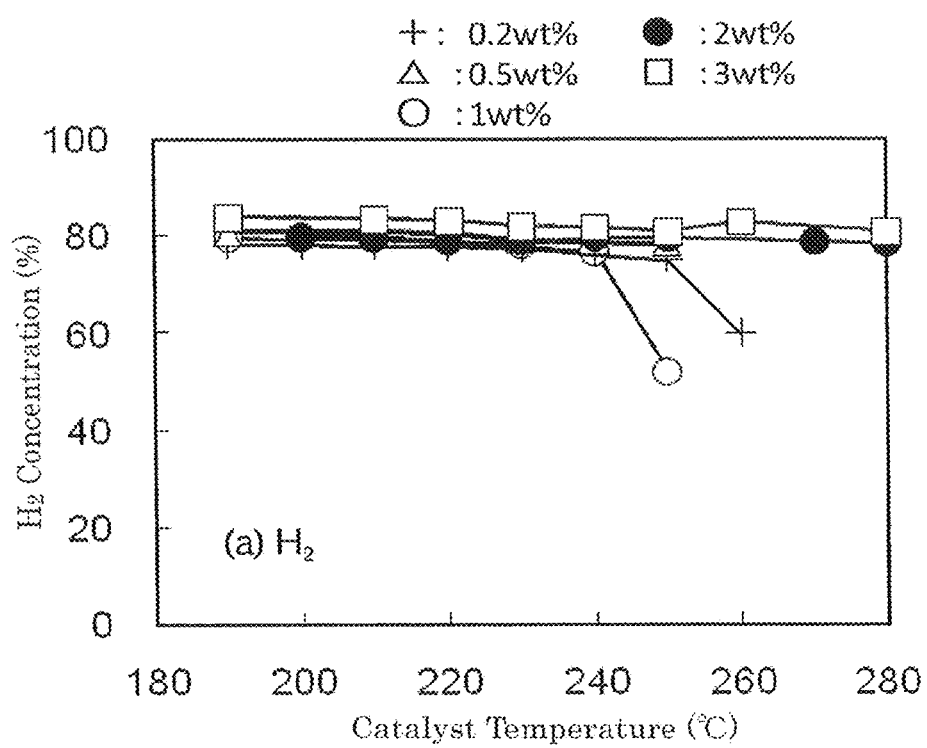
FIGS. 4a to 4e are graphs showing activity evaluation results of cordierite honeycomb catalysts having their respective different Ru support ratios.
Figure 4B:
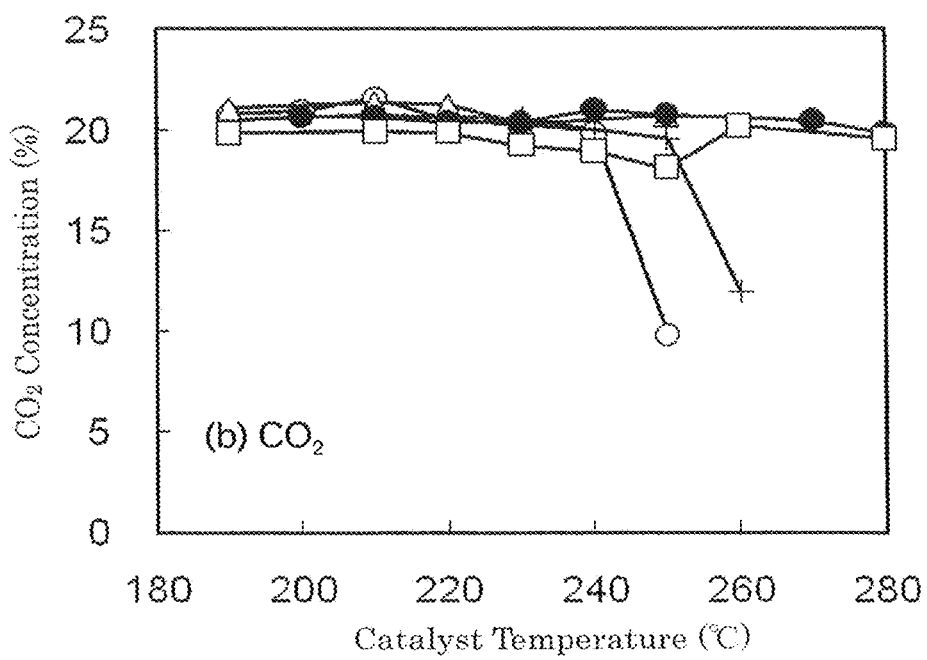
Figure 4C:
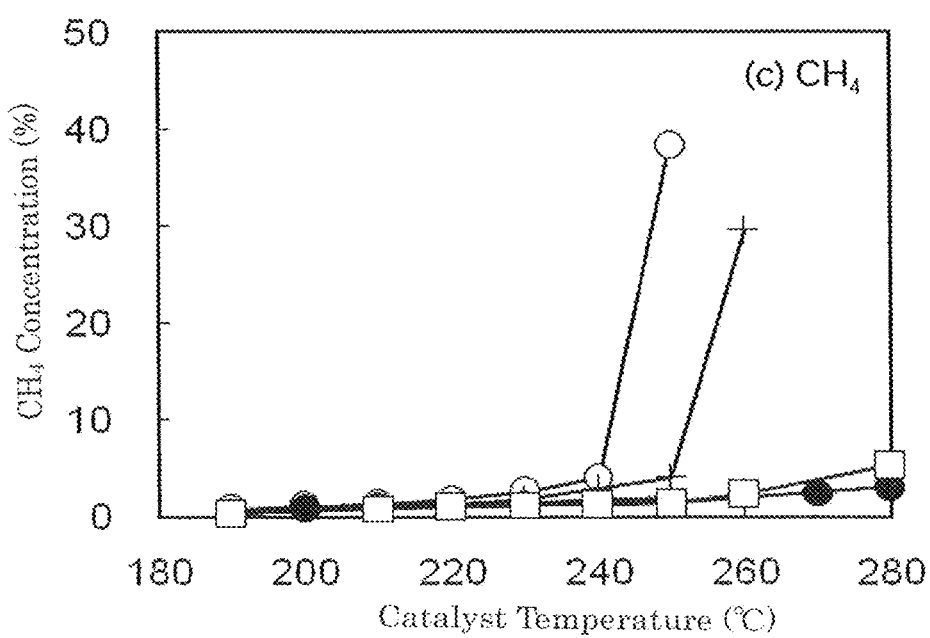
Figure 4D:
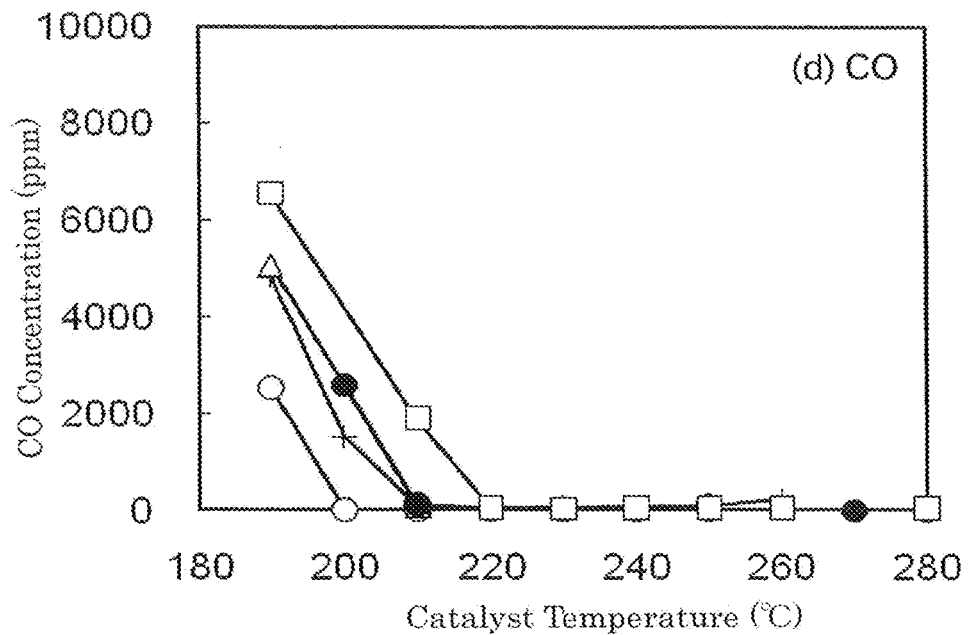
Figure 4E:
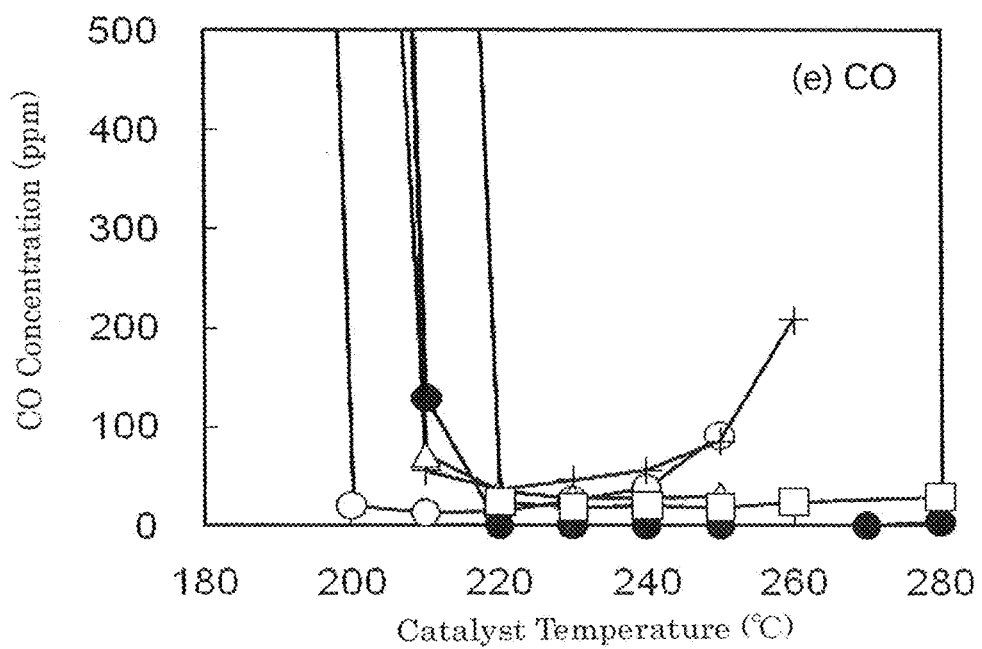

All the supported catalysts coated on cordierite and metal honeycombs, mesoporous material supported granular catalysts, and results of property and activity evaluations of these catalysts are listed in Table 1. The Ni crystallite diameter is here calculated from the half maximum full-width of each diffraction peak based on XRD measurements. The degree of dispersion is calculated from the amount of chemical adsorption of $H_2$ as the ratio of the number of surface exposure moles to the total number of moles of Ni and a metal having a reductive capacity. The outgoing CO concentration at a reaction temperature (catalyst temperature) of 230 degrees C. is shown as an index of CO methanation activities. All the samples have the incoming gas composition described above in this tenth practical example: 1 vol % CO, 80 vol % $H_2$, and 19 vol % $CO_2$. The rate of $H_2$ consumption (%) at a reaction temperature of 230 degrees C. is also shown as an index of CO selectivity. This index indicates the ratio of the amount of $H_2$ consumed during reactions to the amount of incoming $H_2$. In the case where $H_2$ is consumed only in the methanation of 1 vol % CO, the rate of $H_2$ consumption is 3/80×100=3.8% because $H_2$ is consumed three times as much in molar equivalence as CO. When $CO_2$ methanation is added, the rate of hydrogen consumption will exceed this value substantially. Activity evaluation results of the cordierite honeycomb catalysts having their respective different Ru support ratios that correspond, respectively, to Nos. 1 to 5 in Table 1 are shown in FIGS. 4a to 4e. The parameters (Ru support ratios) of each graph are shown in FIG. 4a. It is found from the graphs that with an increase in the support amount of Ru, temperatures at which $CO_2$ and $H_2$ decrease and $CH_4$ increases, which are observed on the high-temperature side, show a tendency to rise. This indicates that the increase in Ru improves the CO selectivity. In particular, the sample with a Ru support ratio of 3 wt % shows no progress in the $CO_2$ methanation reaction until the temperature reaches around 280 degrees C. This indicates that sites on the support at which $CO_2$ methanation proceeds are blocked by supporting Ru. On the other hand, as for activities on the low-temperature side, the catalyst with a Ru support ratio of 1 wt % shows a progress in the CO methanation reaction at 190 degrees C. or higher, having a highest low-temperature activity. At a Ru support ratio higher or lower than this, the temperature at which the CO methanation is initiated shows a tendency to rise. At present, it is difficult to explain this tendency based on the property values in Table 1. This indicates that the coexistence and solid solubility of Ru and Ni are involved and have their respective optimum values.

Figure 5A:
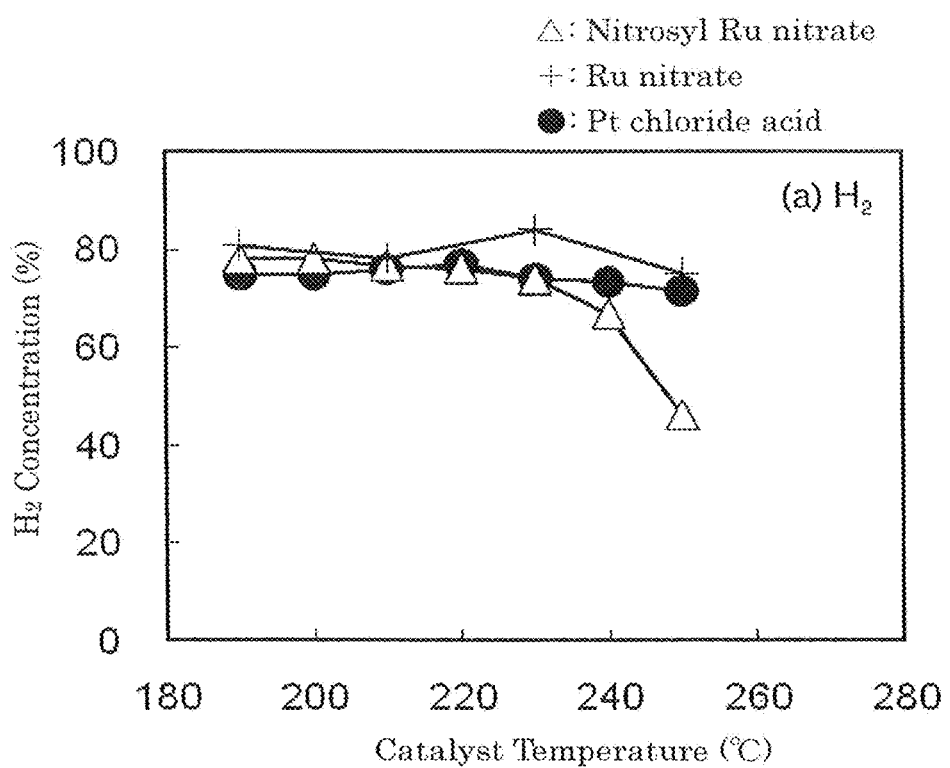
FIGS. 5a to 5e are graphs showing activity evaluation results when using Ru salt and Pt salt other than Ru chloride.
Figure 5B:
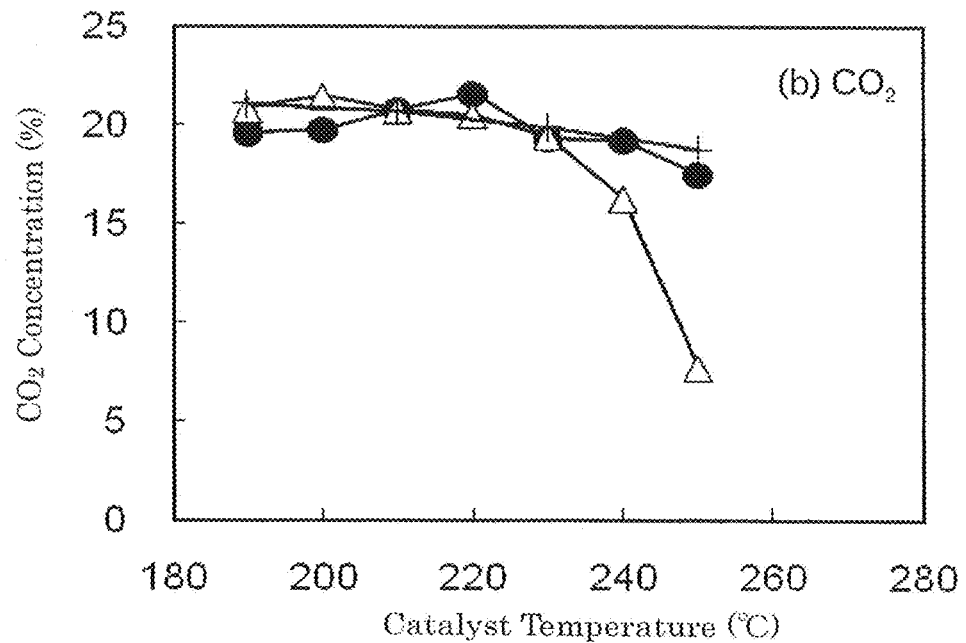
Figure 5C:
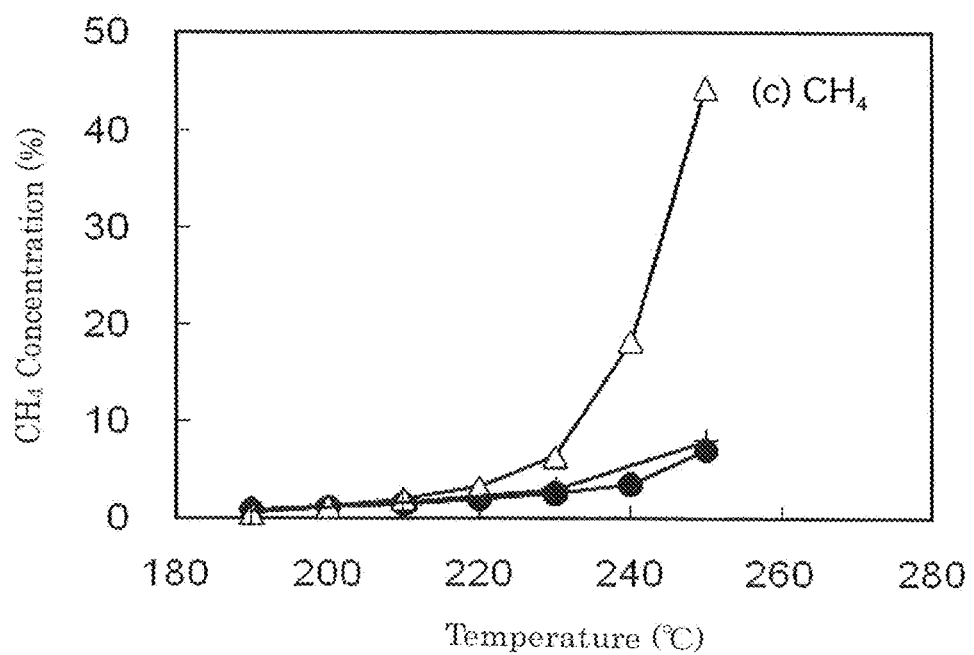
Figure 5D:
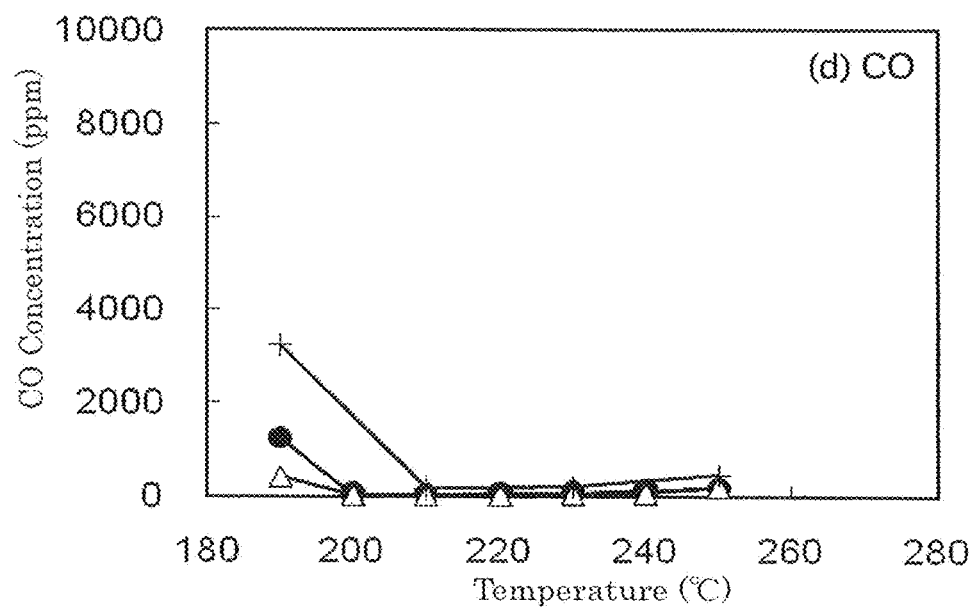
Figure 5E:
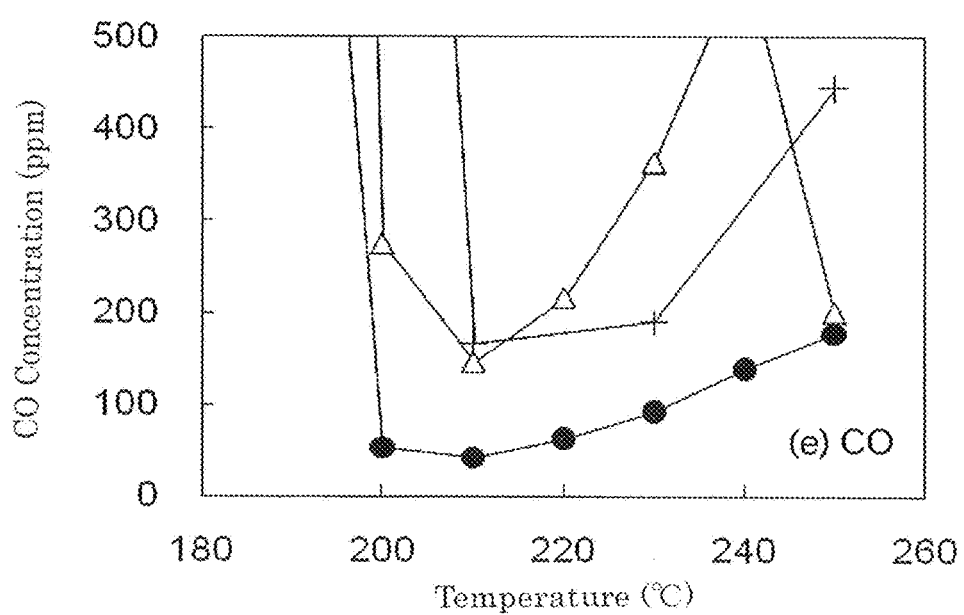
Figure 6A:
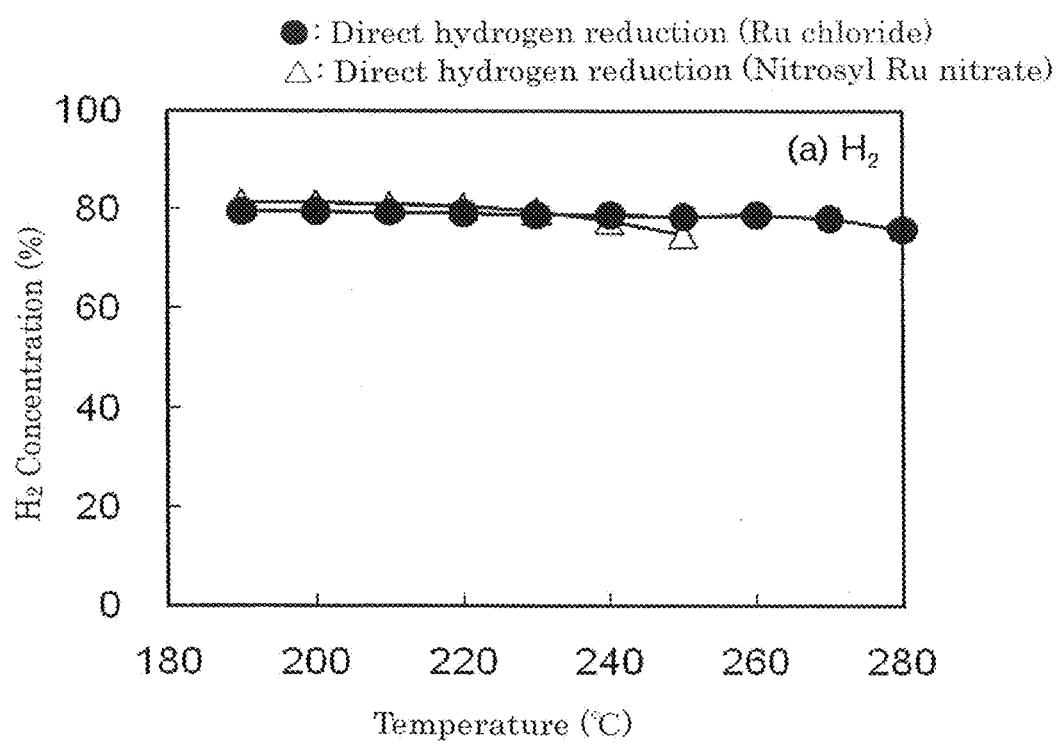
FIGS. 6a to 6e are graphs showing activity evaluation results of a sample (No. 10 in Table 1) produced using a direct reduction process.
Figure 6B:
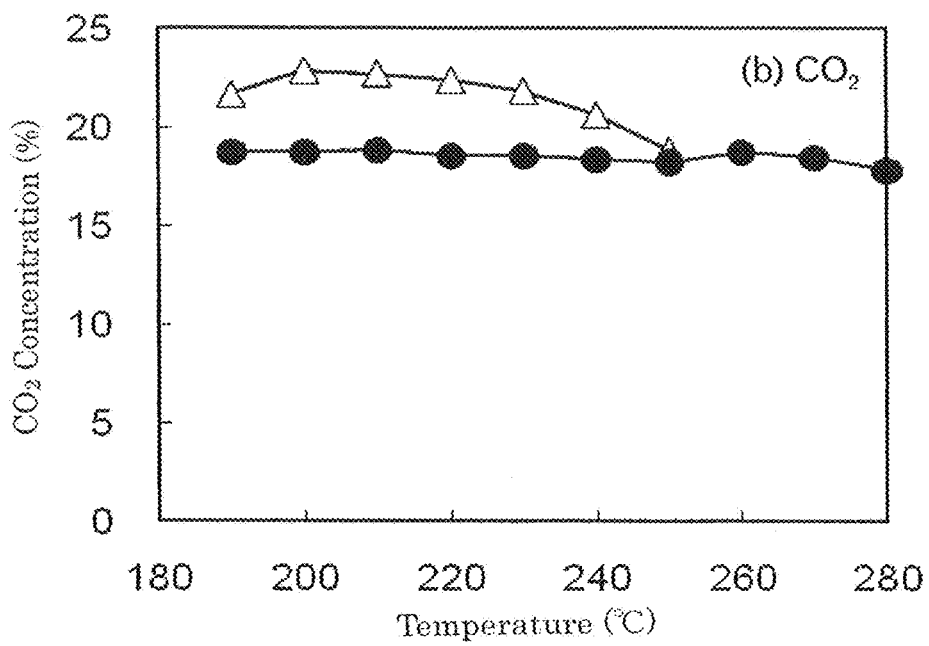
Figure 6C:
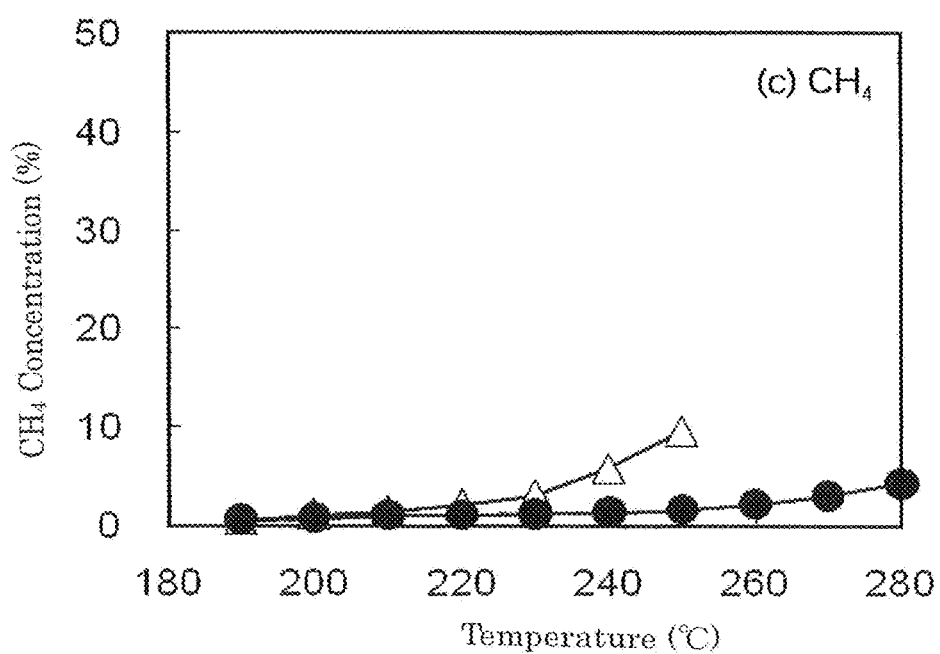
Figure 6D:
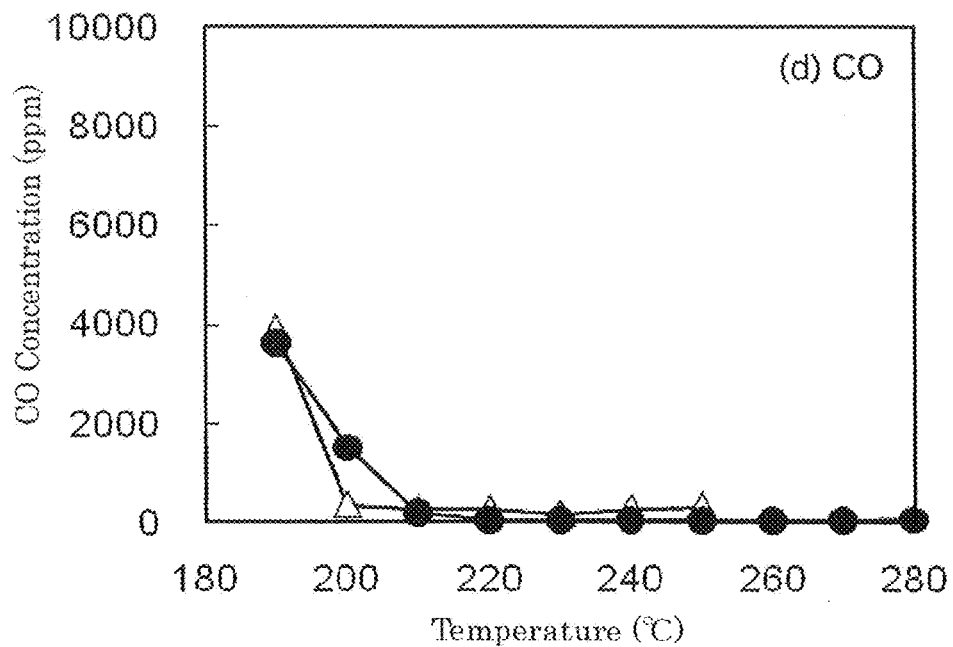
Figure 6E:
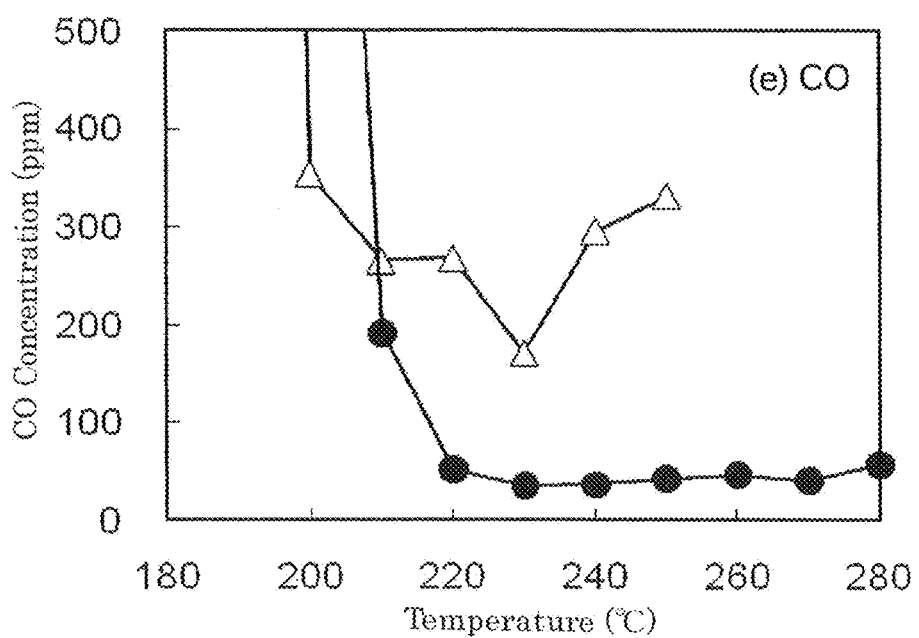

Activity evaluation results of the catalysts using Ru salt or Pt salt other than Ru chloride that correspond, respectively, to Nos. 6, 7, and 9 in Table 1 are shown in FIGS. 5a to 5e. The parameters (nitrosyl Ru nitrate, Ru nitrate, Pt chloride acid) of each graph are shown in FIG. 5a. Nitrosyl Ru nitrate (with a Ru support ratio of 1 wt %) (No. 8) shows first a progress in the $CO_2$ methanation reaction at 240 degrees C. or higher and a highest rate of CO removal of 150 ppm at 210 degrees C. That is, both the CO selectivity and the rate of CO removal are low. Ru nitrate (with a Ru support ratio of 0.5 wt %) (No. 6) shows little progress in the $CO_2$ methanation reaction, but the CO methanation reaction is a little less likely to occur relative to Ru chloride over the whole temperature range. The catalyst with 1 wt % Pt, which has an oxide reductive capacity like Ru, supported thereon from platinum chloride acid shows approximately the same activity and selectivity as Ru.

Figure 7A:
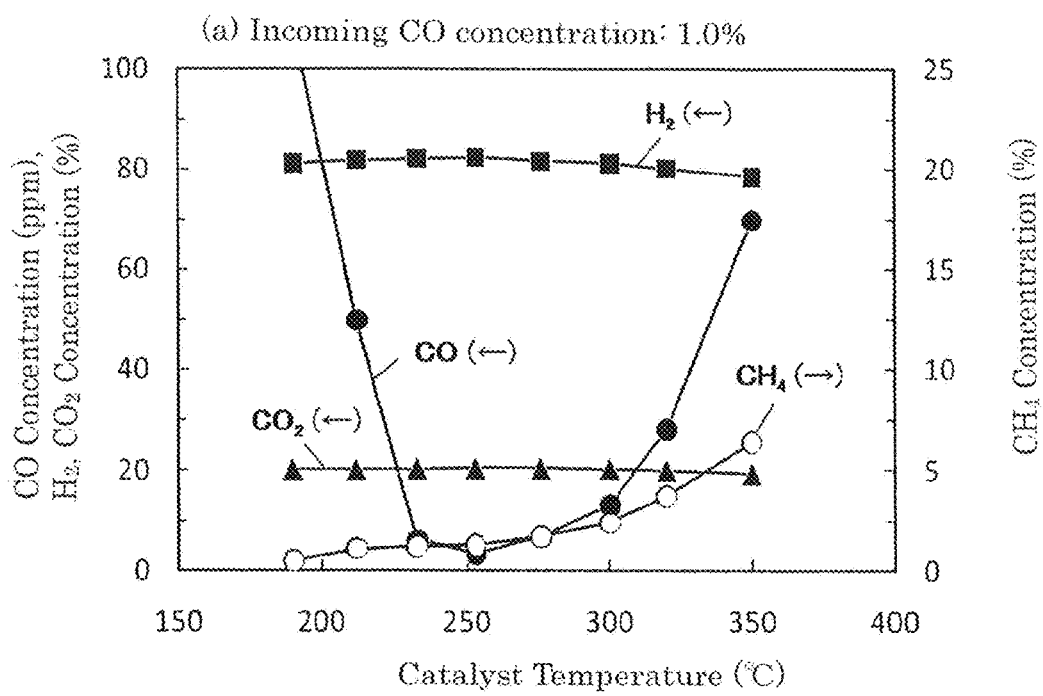
FIGS. 7a to 7c are graphs showing activity evaluation results of a sample No. 11 using a metal honeycomb.
Figure 7B:
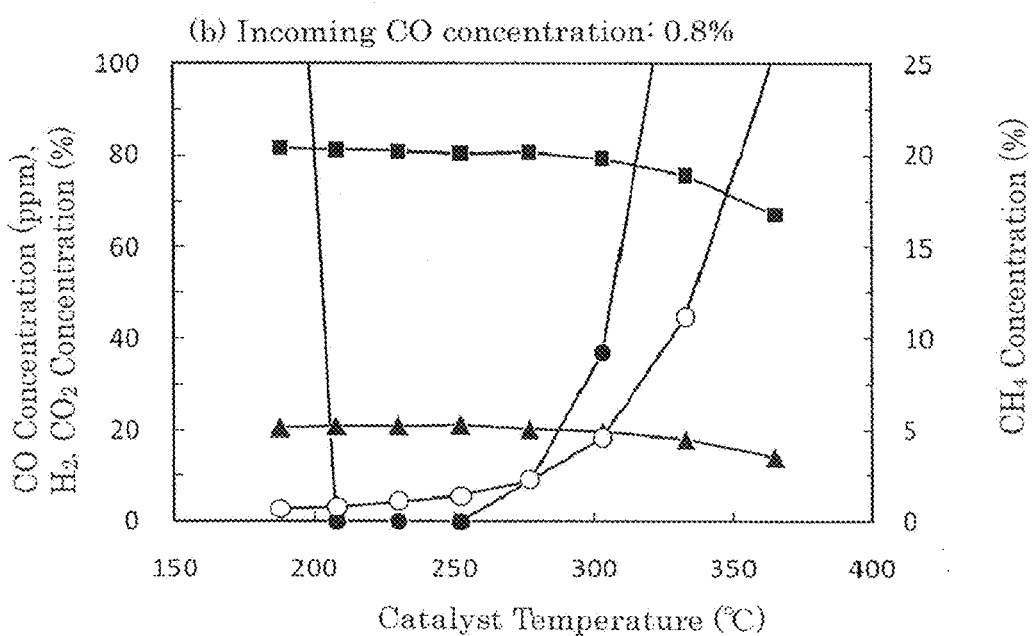
Figure 7C:
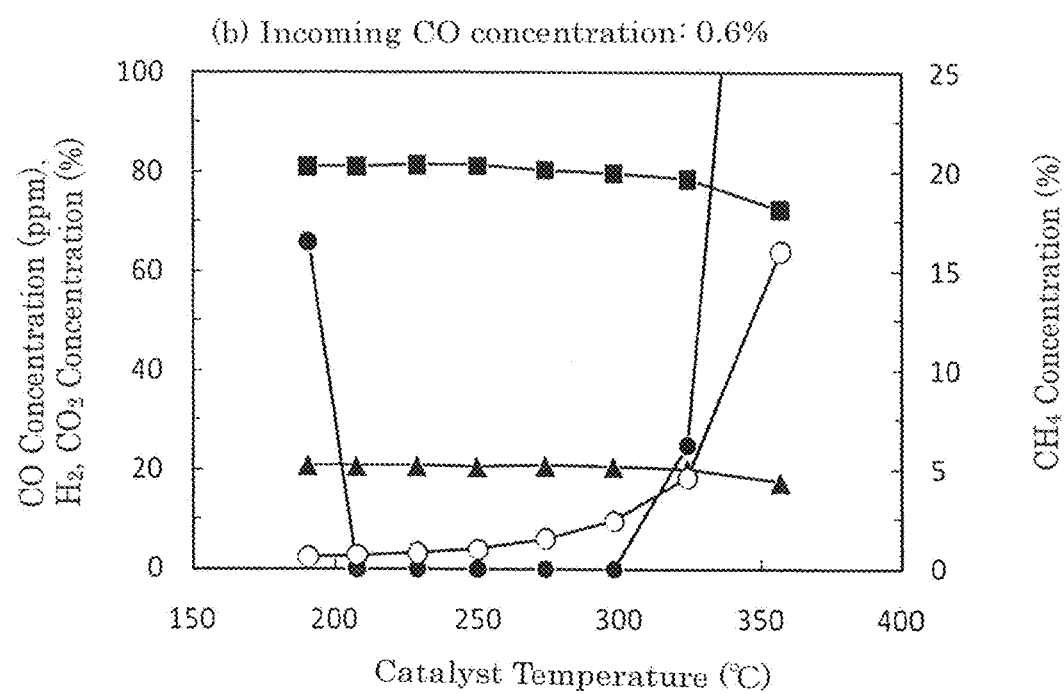

No. 11 in Table 1 is a catalyst produced by supporting 1 wt % Ru from Ru chloride on a precursor prepared by the low-pressure spray plasma technique and being coated not on a ceramic cordierite honeycomb but on a metal honeycomb. Activity evaluation results of the catalyst (No. 11) employing a metal honeycomb are shown in FIGS. 7a to 7c. The parameters ($H_2$, CM, $CO_2$, CO) of each graph are shown in FIG. 7a. Upon the activity evaluation, three types of incoming CO concentrations were set at 1.0%, 0.8%, and 0.6% (FIGS. 7a, 7b, and 7c, respectively) with 80% $H_2$ and $CO_2$ as balance gas. Comparing FIGS. 4a to 4e for the 1 wt % samples employing a cordierite honeycomb with FIG. 7a for the metal honeycomb, it is found that the temperature window shifts toward the high-temperature side. Since the expansion toward the high-temperature side is greater than the shifting width on the low-temperature side, the temperature window results in expanding as a whole. The temperature widths at which the outgoing CO concentration falls below 10 ppm and 20 ppm are, respectively, 60 degrees C. and 83 degrees C. In hydrogen producing and purifying apparatuses, the incoming CO concentration of the CO methanation catalyst is not limited to 1 vol %. For example, in fuel reformers for home-use fuel cells, the incoming CO concentration of the PROX catalyst is designed to be about 0.5 to 1.0 vol % depending on the performance and installation requirements of the shift catalyst. In view of this, the incoming CO concentration was further reduced. The evaluation results are shown in FIGS. 7b and 7c. With a reduction in the incoming CO concentration, the temperature window naturally expands and, when the incoming CO concentration is reduced to 0.6%, the temperature widths at which the outgoing CO concentration falls to zero (below the detection limit) and below 10 ppm are, respectively, 90 degrees C. and 102 degrees C.

TABLE 1

| No. | Composite Oxide Precursor | Ni/Al (molar ratio) | Reductive Metal Salt | Support Ratio (wt %) | Honey-comb | Direct Hydrogen Reduction | Ni Crystallite Diameter (nm) | Amount of Chemical Adsorption (μmol/g-cat) $CO_2$ | Amount of Chemical Adsorption (μmol/g-cat) $H_2$ | Degree of Dispersion (%) | BET Specific Surface Area ($m^2/g$) | Outgoing CO Concentration at 230° C. (ppm) | Rate of $H_2$ Consumption at 230° C. (%) |
|---|---|---|---|---|---|---|---|---|---|---|---|---|---|
| 1 | Low-pressure plasma (First practical example) | 0.29 | Ru chloride (Fourth practical example) | Ru 0.2 | Cordierite (Eighth practical example) | — | 8.1 | 21 | 74 | 3.77 | 126 | 46 | 3 |
| 2 | Low-pressure plasma (First practical example) | 0.29 | Ru chloride (Fourth practical example) | Ru 0.5 | Cordierite (Eighth practical example) | — | 8.2 | 9 | 15 | 0.78 | 123 | 28 | 3 |
| 3 | Low-pressure plasma (First practical example) | 0.29 | Ru chloride (Fourth practical example) | Ru 1.0 | Cordierite (Eighth practical example) | — | 6.1 | 13 | 5 | 0.23 | 138 | 25 | 2 |

TABLE 1-continued

| No. | Composite Oxide Precursor | Ni/Al (molar ratio) | Reductive Metal Salt | Support Ratio (wt %) | Honey-comb | Direct Hydrogen Reduction | Ni Crystallite Diameter (nm) | Amount of Chemical Adsorption (μmol/g-cat) CO$_2$ | Amount of Chemical Adsorption (μmol/g-cat) H$_2$ | Degree of Dispersion (%) | BET Specific Surface Area (m$^2$/g) | Outgoing CO Concentration at 230° C. (ppm) | Rate of H$_2$ Consumption at 230° C. (%) |
|---|---|---|---|---|---|---|---|---|---|---|---|---|---|
| 4 | Low-pressure plasma (First practical example) | 0.29 | Ru chloride (Fourth practical example) | Ru 2.0 | Cordierite (Eighth practical example) | — | 9.4 | 22 | 20 | 1.02 | 134 | 5 | Trace |
| 5 | Low-pressure plasma (First practical example) | 0.29 | Ru chloride (Fourth practical example) | Ru 3.0 | Cordierite (Eighth practical example) | — | 8.7 | 3 | 10 | 0.5 | 130 | 18 | 1 |
| 6 | Low-pressure plasma (First practical example) | 0.29 | Ru nitrate (Fifth practical example) | Ru 0.5 | Cordierite (Eighth practical example) | — | 9.1 | 57 | 130 | 6.65 | 136 | 189 | 5 |
| 7 | Low-pressure plasma (First practical example) | 0.29 | Nitrosyl Ru nitrate (Sixth practical example) | Ru 1.0 | Cordierite (Eighth practical example) | — | 8.3 | 30 | 173 | 8.82 | 152 | 363 | 27 |
| 8 | Low-pressure plasma (First practical example) | 0.29 | Nitrosyl Ru nitrate (Sixth practical example) | Ru 1.0 | Cordierite (Eighth practical example) | Direct Hydrogen Reduction (Twelfth practical example) | — | — | — | — | — | 170 | 3 |
| 9 | Low-pressure plasma (First practical example) | 0.29 | Tetraamine Pt dichloride (Seventh practical example) | Pt 1.0 | Cordierite (Eighth practical example) | — | 9.1 | 19 | 54 | 2.76 | 119 | 92 | 7 |
| 10 | Low-pressure plasma (First practical example) | 0.29 | Ru chloride (Fourth practical example) | Ru 1.0 | Cordierite (Eighth practical example) | Direct Hydrogen Reduction (Eleventh practical example) | 8.3 | 8 | 22 | 1.11 | 131 | 35 | Trace |
| 11 | Low-pressure plasma (First practical example) | 0.29 | Ru chloride (Fourth practical example) | Ru 1.0 | 1-inch-φ metal (Ninth practical example) | — | — | — | — | — | — | 6 | 3 |
| 12 | Low-pressure plasma (First practical example) | 0.29 | Ru chloride (Fourth practical example) | Ru 1.0 | 100-φ metal (Ninth practical example) | — | — | — | — | — | — | 10 | 4 |
| 13 | Atmospheric plasma (Second practical example) | 0.29 | Ru chloride (Fourth practical example) | Ru 1.0 | Cordierite (Eighth practical example) | — | — | — | — | — | — | 25 | 3 |
| 15 | Mesoporous material (Third practical example) | 0.11 | Ru chloride (Fourth practical example) | Ru 1.0 | Particle | Direct Hydrogen Reduction (Eleventh practical example) | — | — | — | — | 299 | 27 (270° C.) | Trace |
| 16 | Mesoporous material (Third practical example) | 0.25 | Ru chloride (Fourth practical example) | Ru 1.0 | Particle | Direct Hydrogen Reduction (Eleventh practical example) | 6.7 | — | — | — | — | 0 (240° C.) | Trace |

TABLE 1-continued

| No. | Composite Oxide Precursor | Ni/Al (molar ratio) | Reductive Metal Salt | Support Ratio (wt %) | Honey-comb | Direct Hydrogen Reduction | Ni Crystallite Diameter (nm) | Amount of Chemical Adsorption (μmol/g-cat) CO$_2$ | Amount of Chemical Adsorption (μmol/g-cat) H$_2$ | Degree of Dispersion (%) | BET Specific Surface Area (m$^2$/g) | Outgoing CO Concentration at 230° C. (ppm) | Rate of H$_2$ Consumption at 230° C. (%) |
|---|---|---|---|---|---|---|---|---|---|---|---|---|---|
| 17 | Mesoporous material (Third practical example) | 0.33 | Ru chloride (Fourth practical example) | Ru 1.0 | Particle | Direct Hydrogen Reduction (Eleventh practical example) | — | — | — | — | 242 | 5 (230° C.) | 0.6 |
| 18 | γ-AL$_2$O$_3$ (First comparative example) | — | Ni, Ru stepwise impregnation (First comparative example) | Ru 1.0 | Cordierite (Eighth practical example) | — | 10.4 | 25 | 17 | 0.87 | 189 | 11200 | 1 |
| 19 | Codispersed NiAl$_2$O$_4$ (Second comparative example) | 0.50 | Ru chloride (Fourth practical example) | Ru 1.0 | Cordierite (Eighth practical example) | — | 8.5 | 68 | 17 | 0.86 | 188 | 4580 | 1 |

Eleventh Practical Example

Although in the fourth to sixth practical examples, the resultants were burned in air at 500 degrees C. at the end of each procedure, the resultant in this practical example was burned not in air but in hydrogen to achieve a higher degree of dispersion with the same support amount of ruthenium as mentioned above (this technique will hereinafter be referred to as "direct hydrogen reduction").

With the same procedure as in the fourth practical example, a sample with 1 wt % ruthenium supported thereon was prepared, except that the resultant was burned for three hours not in air but in hydrogen at 500 degrees C. Thereafter, the powder was coated on a cordierite honeycomb of 400 cpsi with 12 mm square×30 mm of length in accordance with the procedure described in the eighth practical example. Further, the activity of the honeycomb catalyst was evaluated in accordance with the procedure described in the tenth practical example.

Activity evaluation results of the sample (No. 10 in Table 1) produced using the direct reduction technique are shown in FIGS. 6a to 6e (indicated by black circles). The outgoing CO concentration is 50 ppm or less at a temperature of 220 to 280 degrees C., and the CO$_2$ methanation reaction does not proceed at 270 degrees C. or lower. Compared to the samples with a Ru support ratio of 1 wt % not undergoing direct hydrogen reduction with which the CO$_2$ methanation reaction occurred at 240 degrees C. or higher as shown in FIGS. 4a to 4e, the samples of this practical example show an improvement in the selectivity.

After the reaction, the same honeycomb catalyst underwent hydrogen reduction again. As a result of another activity evaluation, it is found that the outgoing CO concentration shows a lower value of 25 ppm at around 230 to 250 degrees C. and, on the high-temperature side, the CO$_2$ methanation reaction slightly occurs at 290 degrees C. or higher, exhibiting a sufficient reproducibility. Direct hydrogen reduction allows samples with a Ru support ratio of 1 wt % to have a high activity at a temperature width of about 50 degrees C. like samples with a Ru support ratio of 2 to 3 wt %, which practically offers a very substantial advantage.

Twelfth Practical Example

As for the sixth practical example in which nitrosyl ruthenium nitrate (Ru(NO)(NO$_3$)$_3$ was used as ruthenium salt, the resultant also underwent hydrogen reduction for three hours at 500 degrees C., as is the case in the eleventh practical example, to produce a cordierite honeycomb catalyst. Activity evaluation results are shown in an overlapped manner in FIGS. 6a to 6e (indicated by white triangles). From these results, it is found that the CO$_2$ methanation slightly proceeds at about 250 degrees C. or higher and the direct reduction technique improves the CO selectivity. This is considered to be due to the fact that Ru blocks base spots on the catalyst efficiently with no sintering.

Thirteenth Practical Example

Figure 8A:
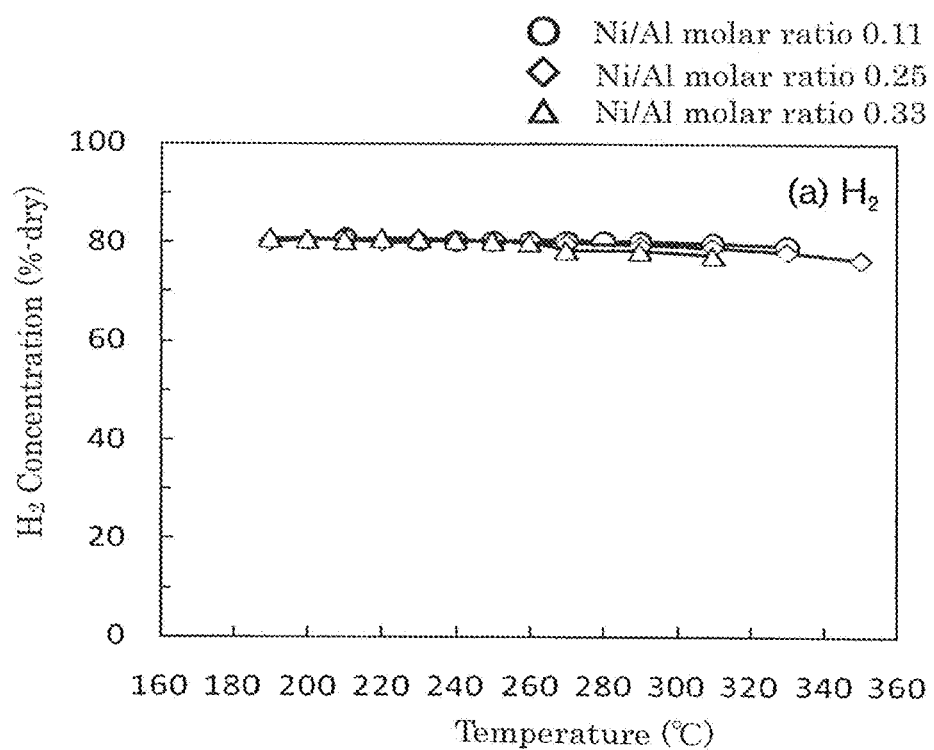
FIGS. 8a to 8e are graphs showing activity evaluation results of particles with a size of 1.2 to 2.0 mm produced not by honeycomb coating but by forming into a pellet and thereafter lightly pulverizing and classifying.
Figure 8B:
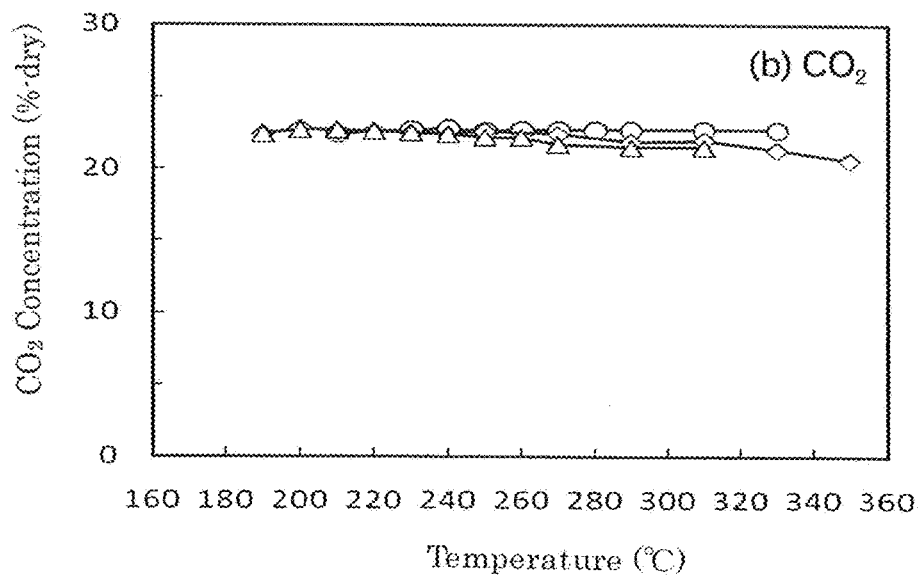
Figure 8C:
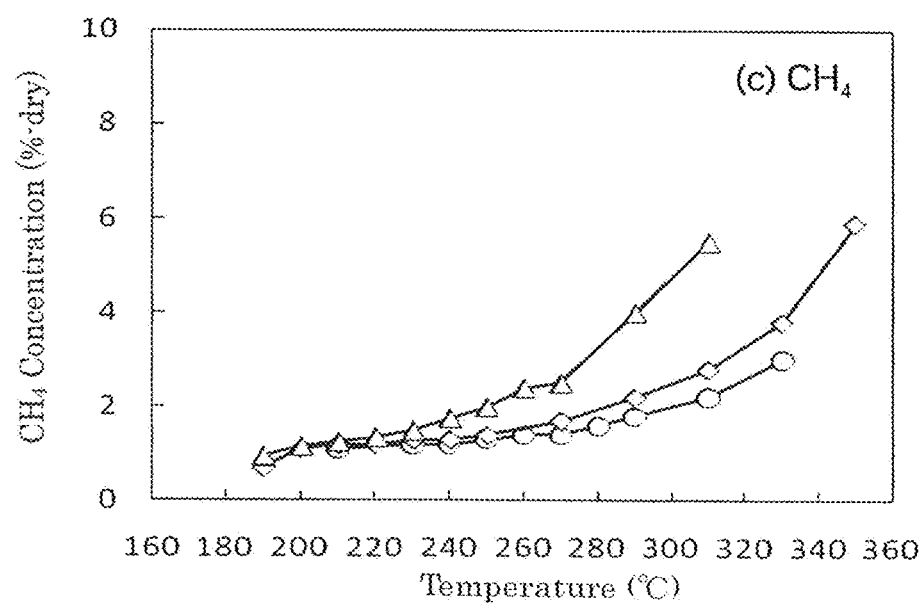
Figure 8D:
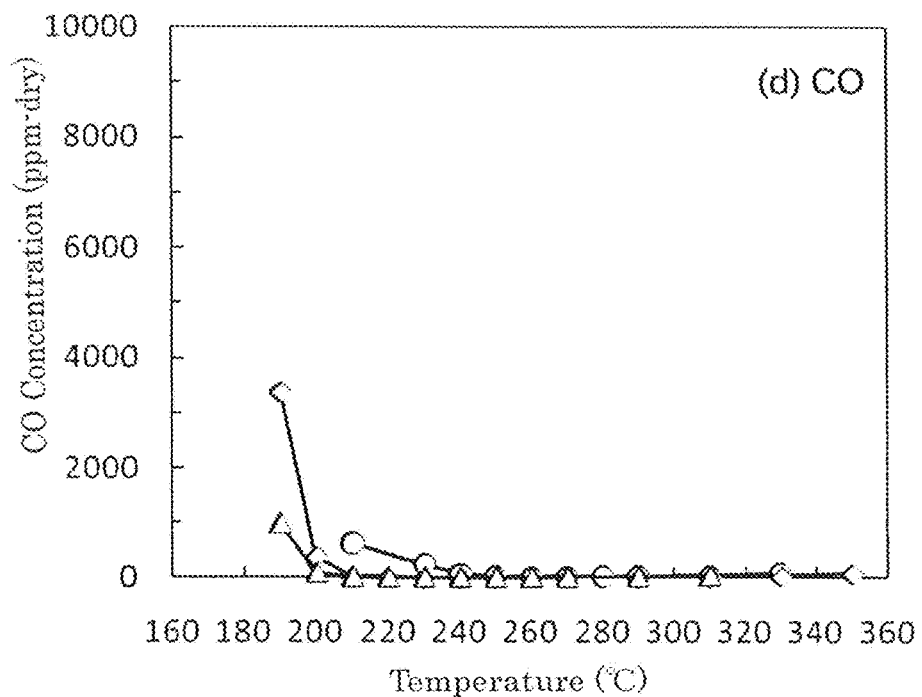
Figure 8E:
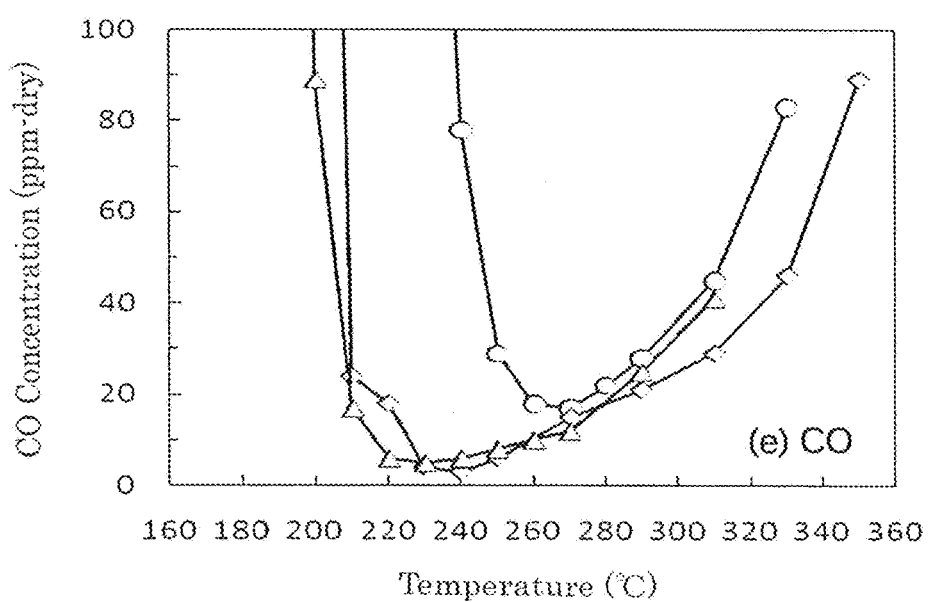

Using a mesoporous material precursor according to the third practical example with ruthenium chloride, a sample with a Ru support ratio of 1 wt % was produced. Here in view of the fact that mesoporous materials are structurally more sensitive to heat than plasma precursors, the resultant underwent hydrogen reduction for three hours at 350 degrees C., though at 500 degrees C. in the eleventh practical example. Although coating the powder prepared using the direct hydrogen reduction technique on a cordierite honeycomb further needed several times of burning in air at 500 degrees C., in order to avoid its influence, no honeycomb coating was applied in this practical example. Instead, the powder was formed into a pellet and thereafter lightly pulverized and classified to produce particles with a size of 1.2 to 2.0 mm. Activity evaluation results are shown in FIGS. 8a to 8e. The parameter (Ni/Al molar ratio) of each graph is shown in FIG. 8a. Compared to the catalysts produced by the plasma technique shown in FIGS. 4a to 4e, it is found that CO$_2$ methanation is significantly suppressed. At the same time, the CO methanation activity is high. This is an advantageous effect of direct hydrogen reduction at low temperature, considered to be due to the fact that Ru shows a high dispersion without undergoing oxidation and the low-temperature reduction prevents Ni from aggregating to disperse finely on the catalyst. Although with a reduction in the Ni content of mesoporous material precursors (i.e. reduction in the Ni/Al molar ratio), the temperature at which the CO methanation reaction is initiated shows a tendency to shift toward the high-temperature side, since the temperature at which the $CO_2$ methanation reaction occurs also shifts toward the high-temperature side, the service temperature width remains wide. This feature allows for the production and supply of catalysts having their respective different operating temperatures in accordance with the specification of hydrogen producing and purifying apparatuses into which the catalysts are incorporated, without changing the operating temperature width of the catalysts.

Fourteenth Practical Example $H_2$ pulse measurements were performed to examine the amount of adsorption of $H_2$ and Ni particle size on the catalysts, while $CO_2$ pulse measurements were performed to examine the number of base spots on the catalysts. An atmospheric circulation-type pulse adsorption measuring apparatus (BEL-CAT from BEL JAPAN, Inc.) was used in these measurements. As a pretreatment, the catalysts were heated up to 500 degrees C. at 20 degrees C./min under a He atmosphere, and thereafter kept at the temperature (500 degrees C.) for one hour in $H_2$ to undergo hydrogen reduction. Next, under a He atmosphere again, $H_2$ was removed for one hour at 510 degrees C. After that, the temperature of the catalysts was lowered down to 35 degrees C. and the thermal conductivity detector (TCD) in the atmospheric circulation-type pulse adsorption measuring apparatus is stabilized for about ten minutes, and then $H_2$ pulse measurements (5% $H_2$/Ar) and $CO_2$ pulse measurements (10% $CO_2$/He) were performed. The results are shown also in Table 1.

First Comparative Example

A catalyst sample was produced by supporting nickel and ruthenium, active metallic species, sequentially on a commonly-used support without using a composite oxide precursor according to the present invention and the activity thereof was compared to that of the catalyst according to the present invention. This technique will hereinafter be referred to as stepwise impregnation.

The catalyst support used was γ-$Al_2O_3$. First, 7.6 g of γ-$Al_2O_3$ powder was introduced into 30 mL of deionized water to prepare a suspension. Next, 11.3 g of $Ni(NO_3)_2$.$6H_2O$ (from KANTO CHEMICAL Co., Inc.) was dissolved in 20.0 mL of deionized water and added entirely to the stirred γ-$Al_2O_3$ suspension using a burette in about twenty minutes. The resulting suspension was stirred for thirty minutes at room temperature and further for thirty minutes in hot water at 40 degrees C., and thereafter once cooled down to room temperature and applied to an evaporator in hot water at 35 to 40 degrees C. to evaporate moisture completely. The resulting powder was impregnated with ruthenium in accordance with the procedure described in the fourth practical example and coated on a cordierite honeycomb in accordance with the procedure described in the eighth practical example. The activity of the honeycomb catalyst was evaluated in accordance with the procedure described in the tenth practical example. As shown in FIGS. 10a to 10d (indicated by white triangles), the catalyst shows neither CO nor $CO_2$ methanation activity and does not demonstrate a performance superior to that of the catalyst according to the present invention.

Second Comparative Example

First, 51.45 g of sodium carbonate was dissolved in 485.5 g of distilled water to prepare 1.0 mol/L solution. Next, 14.55 g of nickel nitrate was dissolved in 99.9 g of distilled water to prepare 0.5 mol/L solution. Further, 72.31 g of aluminum nitrate was dissolved in 385.53 g of distilled water to prepare 0.5 mol/L aluminum nitrate solution. The nickel nitrate solution and the aluminum nitrate solution were mixed completely to achieve a Ni/Al molar ratio of 0.5. The sodium carbonate solution was transferred to a 2 L beaker and, while stirred vigorously using a stirrer, added by drops with the mixed nitrate solution slowly using a Komagome pipette in about fifteen minutes and then stirred for one hour. The resulting solution was filtered through a membrane filter and rinsed in 1 L of water, and thereafter the resulting powder was dispersed in 1.5 L of water and then stirred for thirty minutes and filtered. The dispersion and filtering steps were repeated two times to rinse unreacted substances and Na off as much as possible. The resultant was dried half a day under a low-pressure atmosphere at room temperature and then dried for twelve hours at 110 degrees C. in a drying furnace. The resulting gel was grinded and pulverized, and then burned for three hours at 500 degrees C. (at a rate of temperature rise of 1 degree C./min) to obtain $NiAl_2O_4$ powder. This technique will hereinafter be referred to as codispersion.

Subsequently, 0.1280 g of $RuCl_3.nH_2O$ was dissolved in 20.0 g of water and added slowly by drops to a slurry prepared by suspending 5.006 g of the $NiAl_2O_4$ powder obtained by the codispersion technique in 15.0 g of water, and then stirred for on hour. The resultant was transferred to an eggplant-shaped flask and stirred for one hour at 40 degrees C., and then applied to an evaporator at 30 degrees C. to remove the solvent.

The resultant was dried overnight at 110 degrees C. in a drying furnace and then burned for five hours at 500 degrees C. to obtain $NiAl_2O_4$ powder with a Ru support ratio of 1 wt %. This was formed into a honeycomb catalyst in the same manner as described above and the activity thereof was evaluated. The results are shown in an overlapped manner in FIGS. 10a to 10d (indicated by black circles). Neither the CO methanation activity nor the selectivity is superior to the catalyst according to the present invention.

Fifteenth Practical Example

Figure 9:
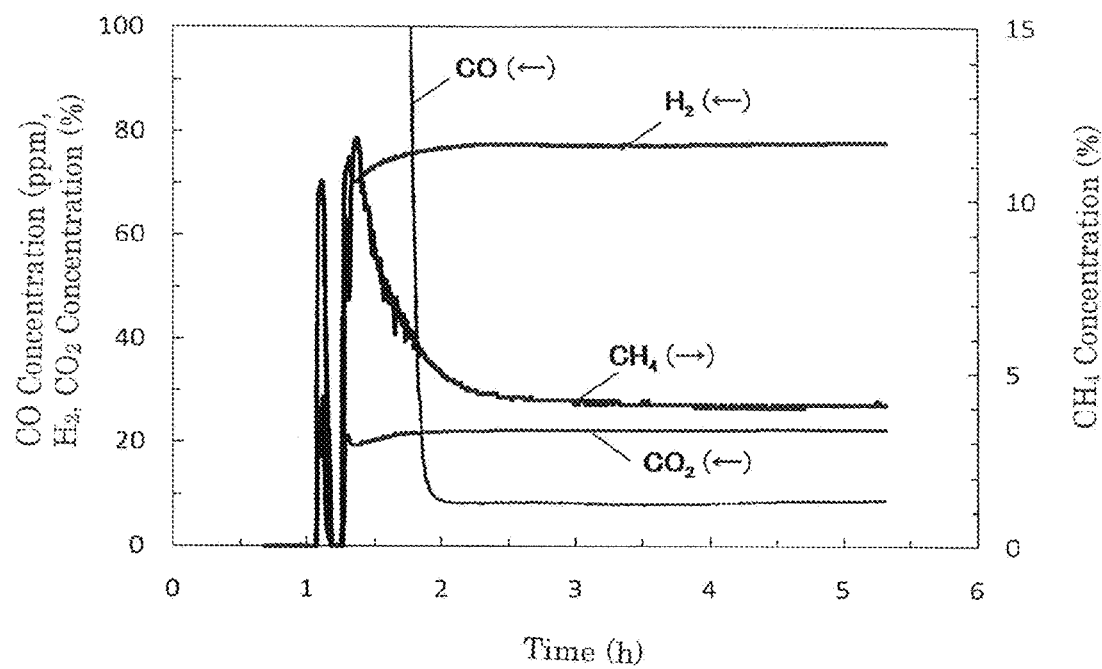
FIG. 9 is a graph showing an operation result of a 1-kW fuel reformer when using methane as fuel.
Figure 10A:
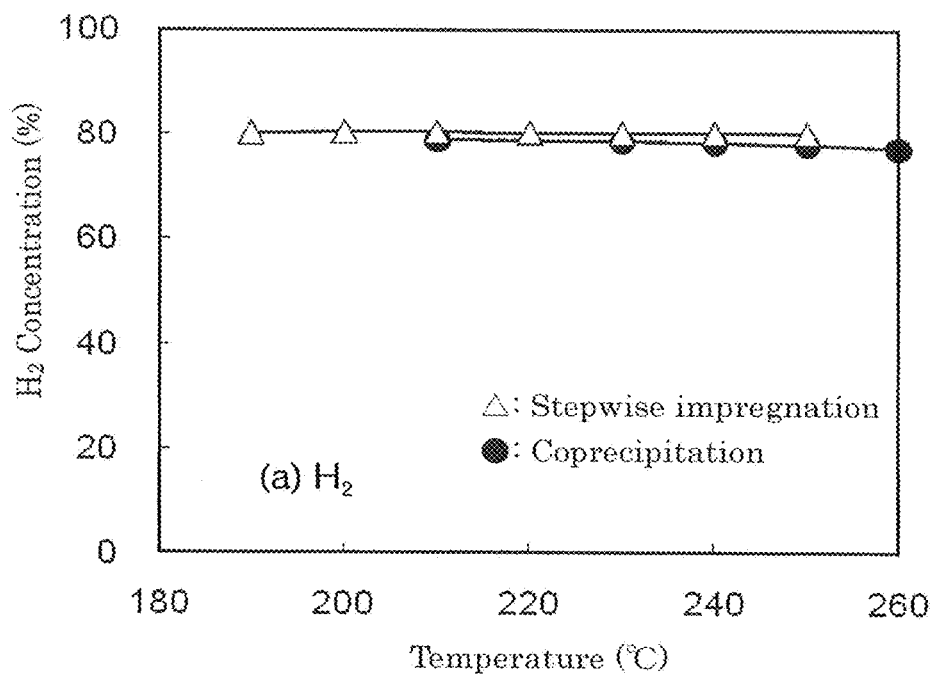
FIGS. 10a to 10d are graphs showing activity evaluation results of catalysts produced using a stepwise impregnation process and a codispersion process.
Figure 10B:
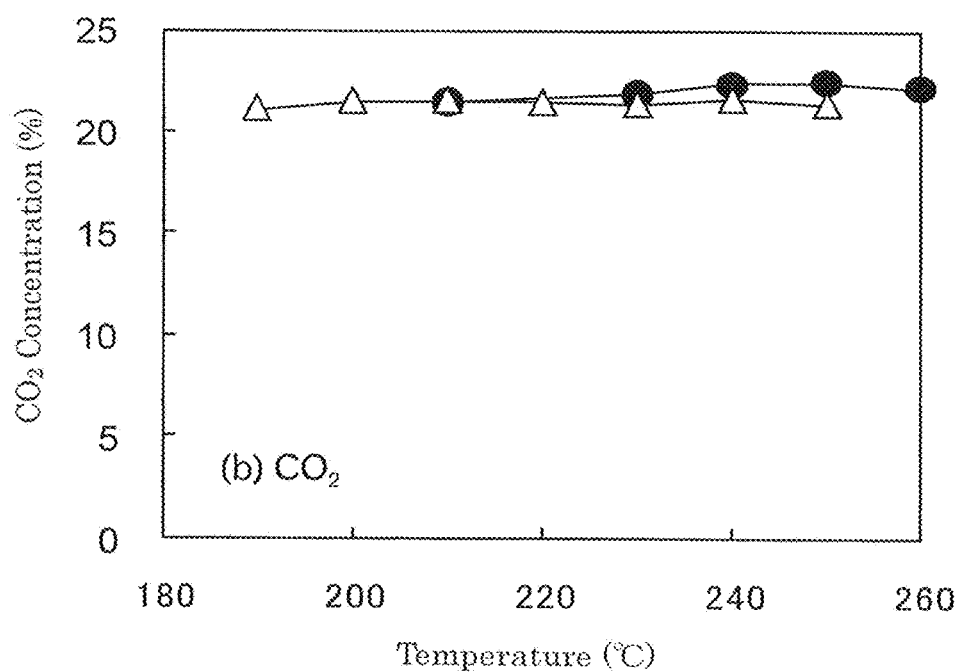
Figure 10C:
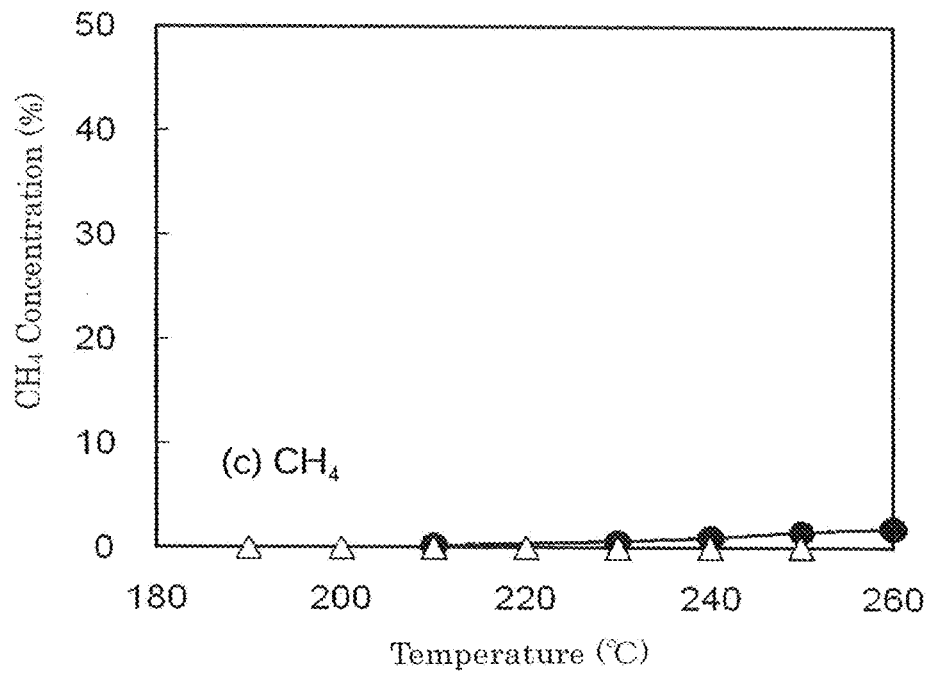
Figure 10D:
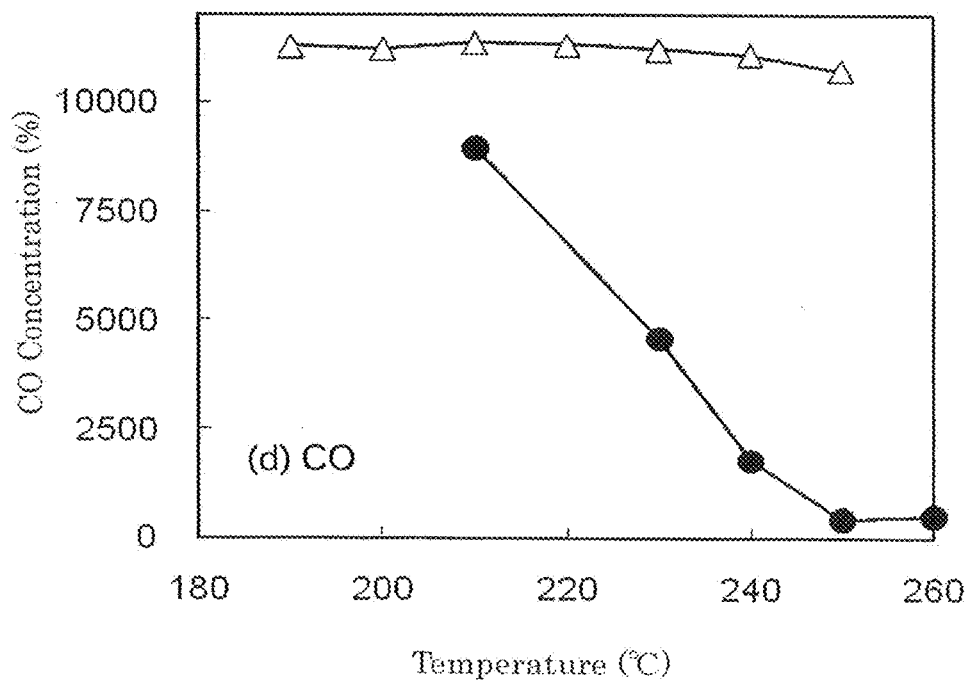

A methane-based 1 kW fuel reformer was produced. A combustion burner was installed at the center and, on the outer periphery thereof, a steam reforming catalyst, a high-temperature shift catalyst, a low-temperature shift catalyst, and finally a selective CO methanation catalyst according to the present invention are installed sequentially. Cordierite honeycombs were used for the steam reforming catalyst and high- and low-temperature shift catalysts. In the selective CO methanation catalyst, three stages of the metal honeycomb catalyst with an outside diameter of 100 mm, a length of 20 mm, and the number of cells of 400 cpsi produced in the ninth practical example were provided in series. A space of about 5 mm was provided between each pair of the three honeycombs. The superficial velocity SV of the selective CO methanation catalyst was 2400 h-1 and the steam/methane molar ratio S/C was 3.0. An operational result is shown in FIG. 9.

The CO concentration of gas outgoing from the fuel reformer decreases to 9 ppm about forty minutes after the start-up of the combustion burner and, during the following operation for four hours, shows a stable value with no substantial fluctuation. In view of the fact that in the fuel reformer of this practical example, the CO concentration outgoing from the low-temperature shift catalyst was designed to be 0.9 Vol % and the amount of coating of the catalyst used was 200 g/L, it is found, in comparison with the results of fundamental tests on the metal honeycomb catalyst (300 g/L) with an outside diameter of 1 inch shown in FIGS. 7a and 7b, that the catalyst offers superior performance even with an increase in size and under a practical environment.

Figure 11A:
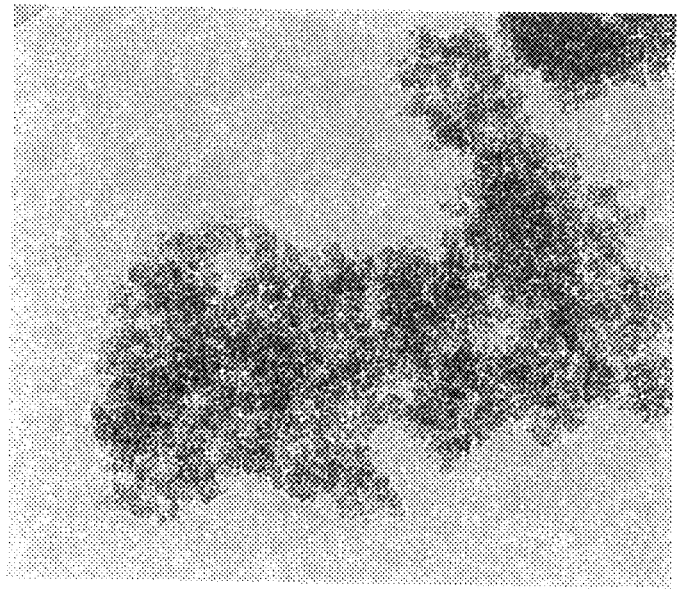
FIGS. 11a and 11b are TEM photos of a catalyst after a hydrogen reduction treatment.
Figure 11B:
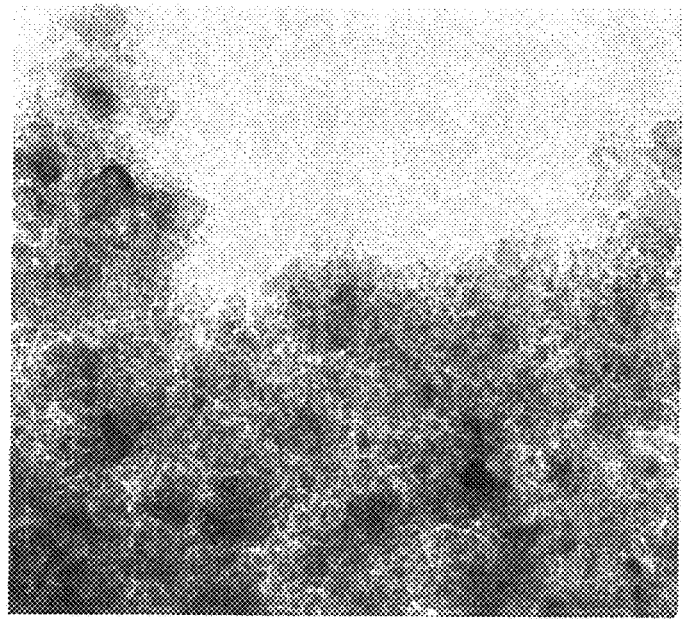

Finally, as for the catalyst material containing Ni and Al of a nonstoichiometric composition disclosed in the fourth practical example, transmission electron microscope (TEM) photos of a sample that underwent hydrogen reduction for a short period of time at low temperature, in particular, for one hour at 500 degrees C. are shown in FIGS. 11a and 11b. This catalyst shows no generation of a substance having a different density (contrast) in the underlying support, except that fine nickel particles (black particles) with a size of about 10 nm were generated at low temperature due to the addition of 1 wt % ruthenium. That is, it is found that nickel and aluminum are distributed substantially uniformly in nanometer (nm) order.

Figure 12A:
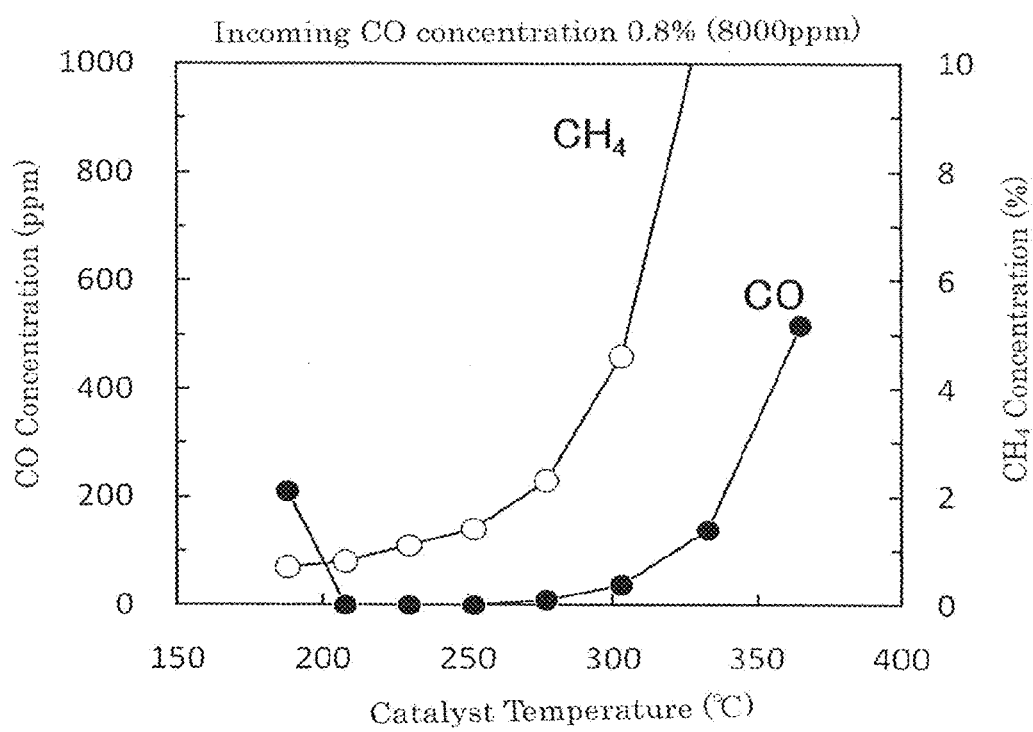
FIGS. 12a and 12b are graphs showing activity evaluation results of the catalyst shown in FIGS. 11a and 11b.
Figure 12B:
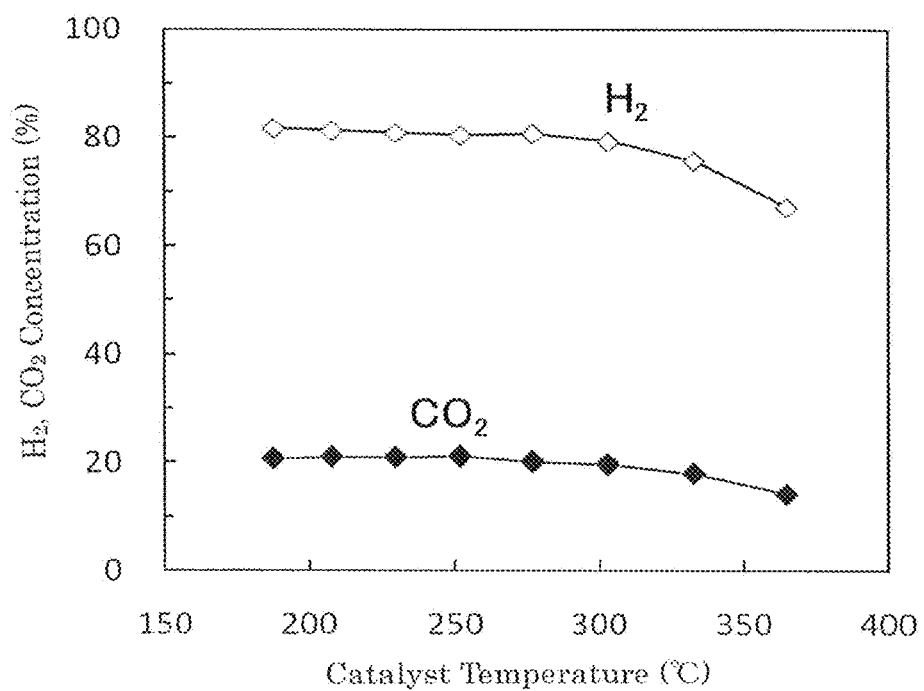

Activity evaluation results of the catalyst sample when coated on a metal honeycomb are shown in FIGS. 12a and 12b (in both of which the incoming CO concentration is 0.8%). These figures show that the catalyst has a high CO methanation activity and selectivity. It is found that the support is thus not only in a nonstoichiometric composition but also contain constituent elements substantially uniformly, which is crucial to the catalyst according to the present invention that has both a high CO methanation activity and selectivity.

INDUSTRIAL APPLICABILITY

As described heretofore in detail, the present invention is directed to a catalyst for selectively transforming carbon monoxide CO into methane $CH_4$, a method of producing and an apparatus using such a catalyst. Not only utilizing a new catalyst material but also forming the resulting catalyst material not into a conventional granular form but into a honeycomb shape for application to a reactor allows hydrogen rich gas with a CO concentration of 10 ppm or less to be generated stably. A catalyst used therefor can be produced at low cost and CO is removed with $H_2$ existing in gas, thereby requiring no air to be supplied and therefore a large air pump and a flow rate regulator, which are indispensable with conventional selective CO oxidation catalysts, resulting in a significant reduction in the system cost. The present invention is applicable and useful as, for example, catalysts for fuel reformers for use in home-use polymer electrolyte fuel cell power generation systems and onside hydrogen stations for fuel cell vehicles as well as hydrogen purifying catalysts for use in chemical plants.

What is claimed is:

1. A method of producing a selective CO methanation catalyst comprising the steps of:
   preparing a composite oxide precursor containing at least nickel and aluminum of a nonstoichiometric and substantially uniform composition; and
   heating the precursor at a temperature of 200 to 700 degrees C. under a reductive gas atmosphere to cause metal nickel particles to disperse from the precursor, and to appear and be supported on a surface thereof,
   wherein the step of preparing a composite oxide precursor comprises the step of heat-treating fine droplets of metal salt solution containing at least nickel and aluminum under atmospheric plasma or low-pressure plasma.

2. The method of producing a selective CO methanation catalyst according to claim 1, further comprising the step of shaping catalyst powder with the metal nickel particles dispersing thereon into grains or a plate or coating onto a honeycomb substrate.

3. The method of producing a selective CO methanation catalyst according to claim 1 further comprising the step of impregnating the composite oxide precursor with raw material salt solution of a metal having an oxide reductive capacity or adding the precursor with the metal prior to the step of heating the precursor under a reductive gas atmosphere.

4. A method of producing a selective CO methanation catalyst comprising the steps of:
   preparing a composite oxide precursor containing at least nickel and aluminum of a nonstoichiometric and substantially uniform composition; and
   heating the precursor at a temperature of 200 to 700 degrees C. under a reductive gas atmosphere to cause metal nickel particles to disperse from the precursor, and to appear and be supported on a surface thereof,
   wherein the step of preparing a composite oxide precursor comprises a sol-gel step for forming a mesoporous material.

5. The method of producing a selective CO methanation catalyst according to claim 4, further comprising the step of shaping catalyst powder with the metal nickel particles dispersing thereon into grains or a plate or coating onto a honeycomb substrate.

6. The method of producing a selective CO methanation catalyst according to claim 4, further comprising the step of impregnating the composite oxide precursor with raw material salt solution of a metal having an oxide reductive capacity or adding the precursor with the metal prior to the step of heating the precursor under a reductive gas atmosphere.

7. A method of producing a selective CO methanation catalyst comprising the steps of:
   preparing a composite oxide precursor containing at least nickel and aluminum of a nonstoichiometric and substantially uniform composition;
   heating the precursor at a temperature of 200 to 700 degrees C. under a reductive gas atmosphere to cause metal nickel particles to disperse from the precursor, and to appear and be supported on a surface thereof; and
   impregnating the composite oxide precursor with raw material salt solution of a metal having an oxide reductive capacity or adding the precursor with the metal prior to the step of heating the precursor under a reductive gas atmosphere.

8. The method of producing a selective CO methanation catalyst according to claim 7, wherein the metal which can promote reduction of oxide includes one or two or more selected from the group consisting of ruthenium, platinum, palladium, rhodium, iridium, and osmium.

9. The method of producing a selective CO methanation catalyst according to claim 7, further comprising the step of shaping catalyst powder with the metal nickel particles dispersing thereon into grains or a plate or coating onto a honeycomb substrate.

* * * * *